(12) United States Patent
Lu

(10) Patent No.: US 10,484,688 B2
(45) Date of Patent: Nov. 19, 2019

(54) METHOD AND APPARATUS FOR ENCODING PROCESSING BLOCKS OF A FRAME OF A SEQUENCE OF VIDEO FRAMES USING SKIP SCHEME

(71) Applicant: ASPEED Technology Inc., Hsinchu (TW)

(72) Inventor: Chung-Yen Lu, Hsinchu (TW)

(73) Assignee: ASPEED TECHNOLOGY INC., Hsinchu (TW)

( * ) Notice: Subject to any disclaimer, the term of this patent is extended or adjusted under 35 U.S.C. 154(b) by 95 days.

(21) Appl. No.: 15/877,871

(22) Filed: Jan. 23, 2018

(65) Prior Publication Data

US 2019/0230358 A1 Jul. 25, 2019

(51) Int. Cl.
| | |
|---|---|
| *H04N 19/132* | (2014.01) |
| *H04N 19/124* | (2014.01) |
| *H04N 19/184* | (2014.01) |
| *H04N 19/70* | (2014.01) |
| *H04N 19/176* | (2014.01) |
| *H04N 19/109* | (2014.01) |
| *H04N 19/136* | (2014.01) |
| *H04N 19/139* | (2014.01) |

(52) U.S. Cl.
CPC ......... *H04N 19/132* (2014.11); *H04N 19/109* (2014.11); *H04N 19/124* (2014.11); *H04N 19/136* (2014.11); *H04N 19/139* (2014.11); *H04N 19/176* (2014.11); *H04N 19/184* (2014.11); *H04N 19/70* (2014.11)

(58) Field of Classification Search
CPC .... H04N 19/132; H04N 19/176; H04N 19/70; H04N 19/139; H04N 19/124; H04N 19/184
USPC ........................ 375/240.01–240.29
See application file for complete search history.

(56) References Cited

U.S. PATENT DOCUMENTS

| | | | | |
|---|---|---|---|---|
| 2016/0277761 | A1* | 9/2016 | Li ........................ | H04N 19/124 |
| 2016/0353106 | A1* | 12/2016 | Sato ..................... | H04N 19/61 |
| 2017/0026645 | A1* | 1/2017 | Zhou .................... | H04N 19/124 |
| 2017/0332091 | A1* | 11/2017 | Maeda ................. | H04N 19/176 |

* cited by examiner

*Primary Examiner* — Jared Walker
(74) *Attorney, Agent, or Firm* — Muncy, Geissler, Olds & Lowe, P.C.

(57) ABSTRACT

A video encoding apparatus is disclosed. The apparatus is used to process a sequence of frames of video data and each frame comprises a plurality of processing blocks. The apparatus comprises a skip decision circuit and an encoder. The skip decision circuit generates a control signal according to a similarity checking result and a comparison result between a first quantization parameter for a first processing block from a current frame and a second quantization parameter for a second processing block from a previous frame. The encoder encodes the first processing block to generate an encoded bit stream and the first quantization parameter. The second processing block resides at the same location in the previous frame as the first processing block in the current frame.

25 Claims, 15 Drawing Sheets

METHOD AND APPARATUS FOR ENCODING PROCESSING BLOCKS OF A FRAME OF A SEQUENCE OF VIDEO FRAMES USING SKIP SCHEME

BACKGROUND OF THE INVENTION

Field of the Invention

The invention relates to video compression technology, and more particularly, to encoding processing blocks of a frame of a sequence of video frames using a skip scheme.

Description of the Related Art

The MPEG Standard narrowly defines a "skip" macroblock as a macroblock (16×16 displayed pixels) within a forward predictive-coded picture (P-picture) which has a zero prediction error and a zero motion vector when the macroblock is compared against its reference macroblock. In a bidirectionally predictive-coded picture (B-picture), a skip macroblock has a zero prediction error and a motion vector that is the same as the motion vector for the previous macroblock, which could not be an intracoded macroblock. Once identified, no bits are used to code a skip macroblock and no information (i.e. no coded coefficients, no header and no prediction information) is sent to the decoder.

In H.264, an encoder can choose SKIP mode for a macroblock in a P- or B-slice; a decoder estimates a motion vector for the skip macroblock from its neighbouring coded macroblocks and uses this to calculate a motion compensated prediction for the skip macroblock. Since there is no residual, the motion compensated prediction is directly inserted into the decoded frame or field. It's up to the encoder to choose whether to code or skip a macroblock. Typically, the encoder might choose SKIP when the rate-distortion cost of SKIP mode is lower than any coded mode, i.e. when a weighted combination of bitrate and distortion (the quality loss of the decoded macroblock) is lower. The encoder may also "guess" that SKIP mode is suitable using other criteria such as local scene statistics, in order to save computation.

However, for video extension application, low-latency and limited transmission bandwidth constrain the video coding scheme. The video extension video coding could not afford several frame delay which adopted by MPEG-like standards. And since it is limited bandwidth, the video coding must do its best to save bits in case of the same content in consecutive frames without suffering any degradation in the perceived quality of the coded video.

SUMMARY OF THE INVENTION

In view of the above-mentioned problems, an object of the invention is to provide a video encoding apparatus capable of reducing the total number of bits required to encode a frame for transmission while still maintaining video detail and quality.

One embodiment of the invention provides a video encoding apparatus. The apparatus is used to process a sequence of frames of video data and each frame comprises a plurality of processing blocks. The apparatus comprises a skip decision circuit and an encoder. The skip decision circuit generates a control signal according to a similarity checking result and a comparison result between a first quantization parameter for a first processing block from a current frame and a second quantization parameter for a second processing block from a previous frame. The encoder encodes the first processing block to generate an encoded bit stream and the first quantization parameter. The second processing block resides at the same location in the previous frame as the first processing block in the current frame.

Another embodiment of the invention provides a video encoding method. The method is used to process a sequence of frames of video data and each frame comprises a plurality of processing blocks. The method comprises: generating a control signal according to a similarity checking result and a comparison result between a first quantization parameter for a first processing block from a current frame and a second quantization parameter for a second processing block from a previous frame; and, encoding the first processing block to generate an encoded bit stream and the first quantization parameter; wherein the second processing block resides at the same location in the previous frame as the first processing block in the current frame.

Another embodiment of the invention provides a video encoding apparatus. The apparatus is used to process a sequence of frames of video data and each frame comprises a plurality of processing blocks. The apparatus comprises a skip decision circuit and an encoder. The skip decision circuit generates a control signal according to a block type, a similarity checking result and a comparison result between a first quantization parameter for a first processing block from a current frame and a second quantization parameter for a second processing block from a previous frame. The encoder encodes a third processing block to generate an encoded bit stream and the first quantization parameter. The third processing block is one of the first processing block and a residual. The second processing block resides at the same location in the previous frame as the first processing block in the current frame.

Another embodiment of the invention provides a video encoding method. The method is used to process a sequence of frames of video data and each frame comprises a plurality of processing blocks. The method comprises: generating a control signal according to a block type, a similarity checking result and a comparison result between a first quantization parameter for a first processing block from a current frame and a second quantization parameter for a second processing block from a previous frame; and, encoding a third processing block to generate an encoded bit stream and the first quantization parameter. The third processing block is one of the first processing block and a residual. The second processing block resides at the same location in the previous frame as the first processing block in the current frame.

Another embodiment of the invention provides a video transmission system. The system comprises a communication channel, a video encoding apparatus, a transmitter, a receiver and a video decoding apparatus. The apparatus comprises a skip decision circuit and an encoder. The skip decision circuit generates a control signal according to a similarity checking result and a comparison result between a first quantization parameter for a first processing block from a current frame and a second quantization parameter for a second processing block from a previous frame. The encoder encodes the first processing block to generate a first encoded bit stream and the first quantization parameter. The transmitter transforms a first formatted bit stream into data packets and transmits the data packets over the communication channel. The receiver receives the data packets and transforms the data packets into a second formatted bit stream. The video decoding apparatus, comprising a reference buffer, separates the second formatted bit stream into a second encoded bit stream and a second skip flag and reconstructs a third processing block from one of the second encoded bit stream and the reference buffer according to the second skip flag. The second processing block resides at the same location in the previous frame as the first processing block in the current frame.

Another embodiment of the invention provides a video transmission system. The system comprises a communication channel, a video encoding apparatus, a transmitter, a receiver and a video decoding apparatus. The apparatus comprises a skip decision circuit and an encoder. The skip decision circuit generates a control signal according to a block type, a similarity checking result and a comparison result between a first quantization parameter for a first processing block from a current frame and a second quantization parameter for a second processing block from a previous frame. The encoder encodes a third processing block to generate a first encoded bit stream and the first quantization parameter. The third processing block is one of the first processing block and a residual. The second processing block resides at the same location in the previous frame as the first processing block in the current frame. The transmitter transforms a first formatted bit stream into data packets and transmits the data packets over the communication channel. The receiver receives the data packets and transforms the data packets into a second formatted bit stream. The video decoding apparatus, comprising a reference buffer and a difference buffer, separates the second formatted bit stream into a second encoded bit stream, a second skip flag and a second type flag and reconstructs a fifth processing block from at least one of the second encoded bit stream, the reference buffer and the difference buffer according to the second skip flag and the second type flag. The second processing block and the fourth processing block respectively reside at the same location in the previous frame and the reference frame as the first processing block in the current frame.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1A:
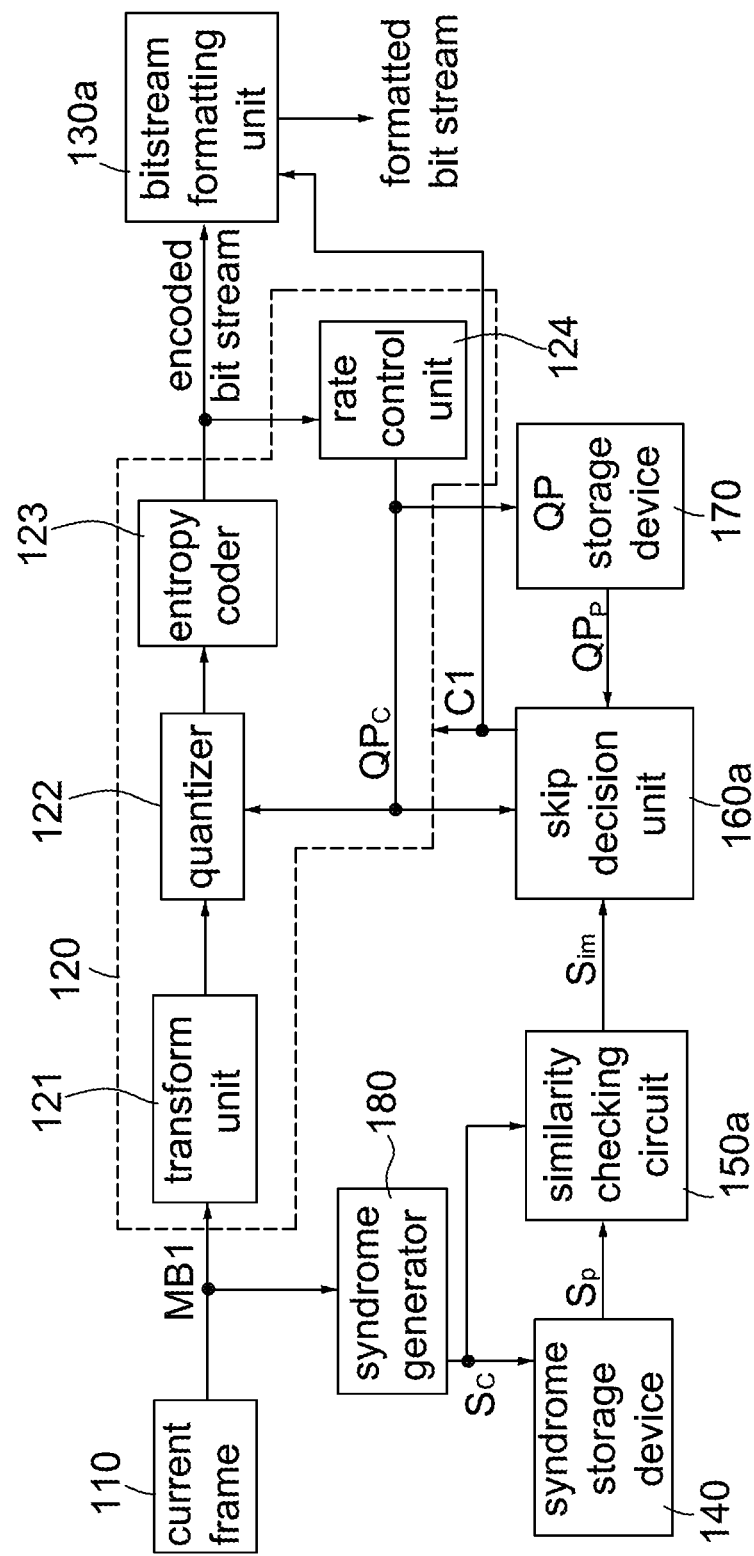
FIG. 1A is a block diagram showing a video encoding apparatus in a dual-line configuration according to one embodiment of the invention.

As used herein and in the claims, the term "and/or" includes any and all combinations of one or more of the associated listed items. The use of the terms "a" and "an" and "the" and similar referents in the context of describing the invention are to be construed to cover both the singular and the plural, unless otherwise indicated herein or clearly contradicted by context.

According to the invention, before a sequence of video frames are fed into a video encoding apparatus of the invention, each frame is divided into a plurality of processing blocks, each consisting of a plurality of pixels. For example, a processing block may consist of 16×16 pixels, which is also called "macroblock" in the art. For purposes of clarity and ease of description, hereinafter, the following examples and embodiments will be described in terms of macroblocks (MBs). However, it is noted that the processing block is not limited to the macroblock, but can be any sizes other than 16×16 pixels; for example, the processing block may consist of 8×8 pixels for use in JPEG coding, or one/two pixel line(s) for use in line-based coding.

The present invention adopts a similarity checking scheme and a skip macroblock scheme for encoding macroblocks of a frame of a sequence of video frames. A feature of the invention is determining whether to skip coding a macroblock based on the image similarity and the quantization values between the corresponding macroblocks at the same location in two adjacent frames to reduce the total number of bits required to encode a frame for transmission while still maintaining video detail and quality. Another feature of the invention is to skip coding a current macroblock in a current frame if the current macroblock has similar content as a corresponding macroblock (i.e., residing at the same location as the current macroblock in the current frame) in its previous frame and the quantization parameter (Qp1) of the current macroblock is greater than or equal to that (Qp2) of the corresponding macroblock of its previous frame; otherwise, the current macroblock is encoded. As well known in the art, "Qp1>=Qp2" indicates the picture quality of the current macroblock is less than or equal to that of the corresponding macroblock in its previous frame. Thus, there is no need to encode a macroblock with less picture quality for transmission, thereby saving the transmission bandwidth and maintaining the picture quality.

As used herein and in the claims, the term "similarity checking scheme" refers to either calculating a SAD (sum of absolute differences) value between two corresponding macroblocks (i.e., at the same location) in two adjacent frames or comparing the image characteristics of the two corresponding macroblocks to determine their image similarity, and the image characteristics are selected from the group comprising: CRCs (cyclic redundancy check), hashes, checksums and a combination thereof. For example, if the SAD value for two corresponding macroblocks in two adjacent frames is less than a threshold, it is determined that the two corresponding macroblocks are similar. The term "I-macroblock" refers to an intra-coded macroblock. The term "P-macroblock" refers to a forward predictive-coded macroblock. Another feature of the invention is that each frame is a combination of I-macroblocks and/or P-macroblocks. In one embodiment, the block type (i.e., I- or P-macroblock) of each macroblock in a frame is determined by a type selector 320 or 320' (will be described later). The term "I-P-P mode" refers to a sequence of macroblocks at the same location in plural adjacent frames, where the sequence begins with an I-macroblock followed by a plurality of P-macroblocks, and each P-macroblock is encoded using the I-macroblock as reference macroblock. By contrast, the term "I-I-I mode" refers to a sequence of I-macroblocks at the same location of plural adjacent frames, and each I-macroblock is encoded using only information present in that frame itself.

FIG. 1A is a block diagram showing a video encoding apparatus according to one embodiment of the invention. Referring to FIG. 1A, the video encoding apparatus 100A of the invention, operating in I-I-I mode, includes an encoder 120, a bitstream formatting unit 130a, a syndrome storage device 140, a similarity checking circuit 150a, a skip decision unit 160a, a QP storage device 170 and a syndrome generator 180. The video encoding apparatus (100A/B/C, 200, 300, 400, 500A/B) processes a sequence of frames of video data, and each frame comprises a plurality of macroblocks. Specifically, the video encoding apparatus 100A is used to receive a current macroblock MB1 of a current frame, determine whether to encode the current macroblock MB1, and generate a formatted bit stream. The formatted bit stream is fed to a transmitter 1030 for transmission over a communication channel 1040 (see FIG. 10 below). The pixel values of the macroblocks MB1 may be generally R, G, B signals or Y, Cb, Cr signals which may be obtained from a video camera, etc, and output as 8-bit digital signals, but the pixel value is not limited to these examples.

According to a control signal C1 from the skip decision unit 160a, the encoder 120 receives a current macroblock MB1 of 16×16 pixels from the current frame 110 and encodes the current macroblock MB1 to generate an encoded bit stream and a quantization parameter ($QP_C$). Here, the quantization parameter includes, without limitation, a quantization step in JPEG/MPEG, and a quantization level in H.264. The syndrome generator 180 receives the current macroblock MB1, calculates a current syndrome Sc and stores the current syndrome Sc in the syndrome storage device 140. Here, the syndrome Sc/Sp includes, without limitation, a cyclic redundancy check (CRC), a checksum and a hash. The similarity checking circuit 150a compares the current syndrome Sc for the current macroblock MB1 and a previous syndrome Sp for a corresponding macroblock (i.e., residing at the same location in a previous frame as the current macroblock MB1 in the current frame 110) in the previous frame to generate a checking output Sim. In one embodiment, the similarity checking circuit 150a is implemented by a comparator; the output Sim with a logic value of 1 represents the current syndrome Sc is equal to the previous syndrome Sp (indicating the current macroblock MB1 and the corresponding macroblock have similar contents), and the output Sim with a logic value of 0 represents the current syndrome Sc and the previous syndrome Sp are different (indicating the current macroblock MB1 and the corresponding macroblock have totally different contents). In one embodiment, the skip decision unit 160a is implemented by a comparator (not shown) that is controlled by the output Sim; the skip decision unit 160a is disabled and generates the control signal C1 with a logic value of 0 if the output Sim has a logic value of 0; if the output Sim has a logic value of 1, the skip decision unit 160a is enabled to compare a current quantization parameter ($QP_C$) for the current macroblock MB1 and a previous quantization parameter ($QP_P$) for the corresponding macroblock to generate the control signal C1. If the output Sim has a logic value of 1 and the quantization value (QPc) of the current macroblock MB1 is greater than or equal to that (QPp) of the corresponding macroblock, it means the image quality of the current macroblock MB1 is less than or equal to that of the corresponding macroblock and thus there is no need to encode the current macroblock MB1 for transmission; accordingly, encoding of the current macroblock MB1 is skipped and thus the skip decision unit 160a generates the control signal C1 with a logic value of 1. If the output Sim has a logic value of 1 and the quantization value (QPc) of the current macroblock MB1 is less than that (QPp) of the corresponding macroblock, it means the image quality of the current macroblock MB1 is greater than that of the corresponding macroblock and thus encoding of the current macroblock MB1 is needed for transmission; accordingly, the skip decision unit 160a generates the control signal C1 with a logic value of 0. In an alternate embodiment, the skip decision unit 160a may be implemented by software, or a combination of hardware and software (or firmware).

According to the invention, the wiring of the control signal C1, the encoder 120 and the bitstream formatting unit 130a is configured in one of three configurations (i.e., a single-line configuration, a dual-line configuration and a bypass configuration) to output a corresponding formatted bit stream. When configured in a dual-line configuration, the control signal C1 is provided to both the encoder 120 and the bitstream formatting unit 130a as shown in FIG. 1A. If the control signal C1 has a logic value of 1, the encoder 120 is disabled without generating any output; the bitstream formatting unit 130a sets a skip flag to 1 (i.e., indicating the current macroblock MB1 is skipped) and assembles the skip flag into the formatted bit stream. If the control signal C1 has a logic value of 0, the encoder 120 is enabled to generate the encoded bit stream, and the bitstream formatting unit 130a sets a skip flag to 0 (i.e., indicating the current macroblock MB1 is not skipped) and assembles the skip flag and the encoded bit stream into the formatted bit stream.

Figure 1B:
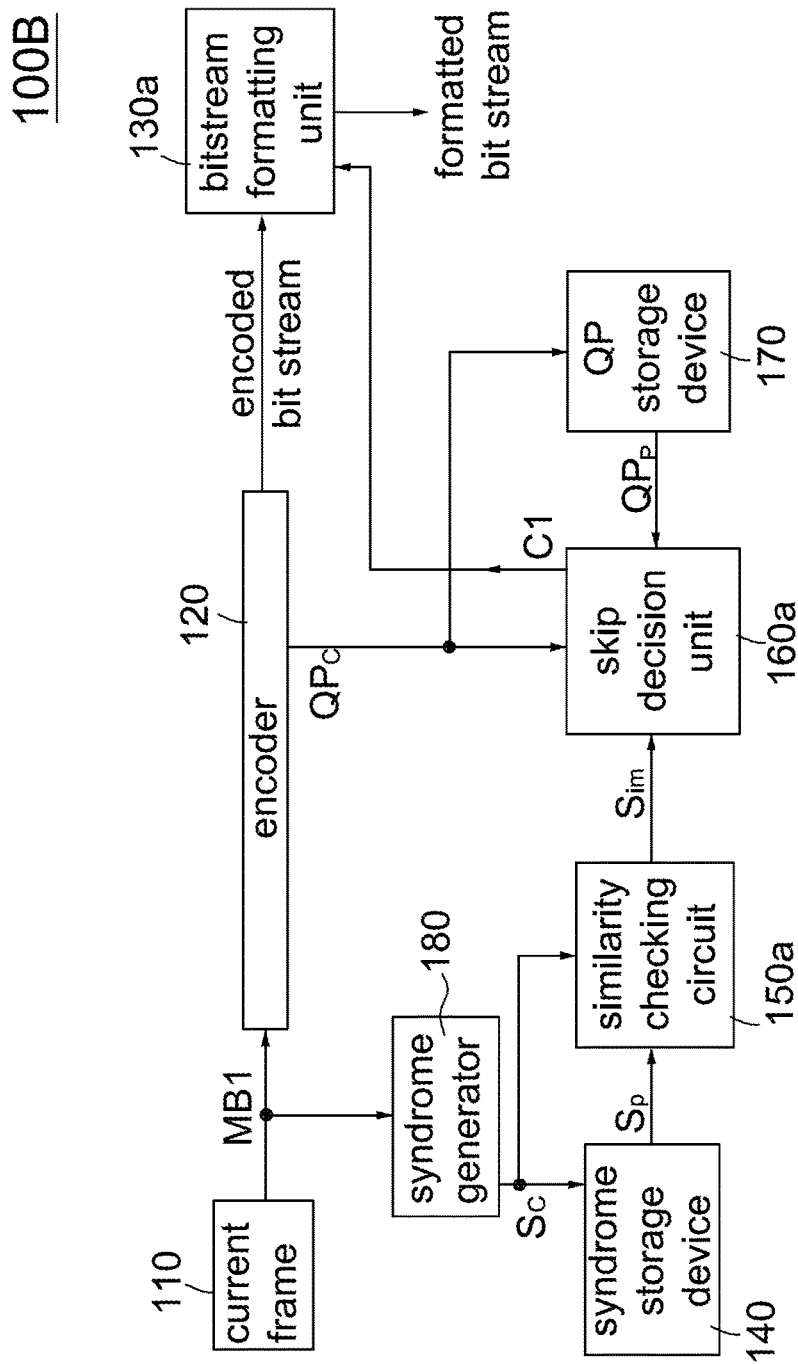
FIG. 1B is a block diagram showing a video encoding apparatus in a single-line configuration according to another embodiment of the invention.
Figure 1C:
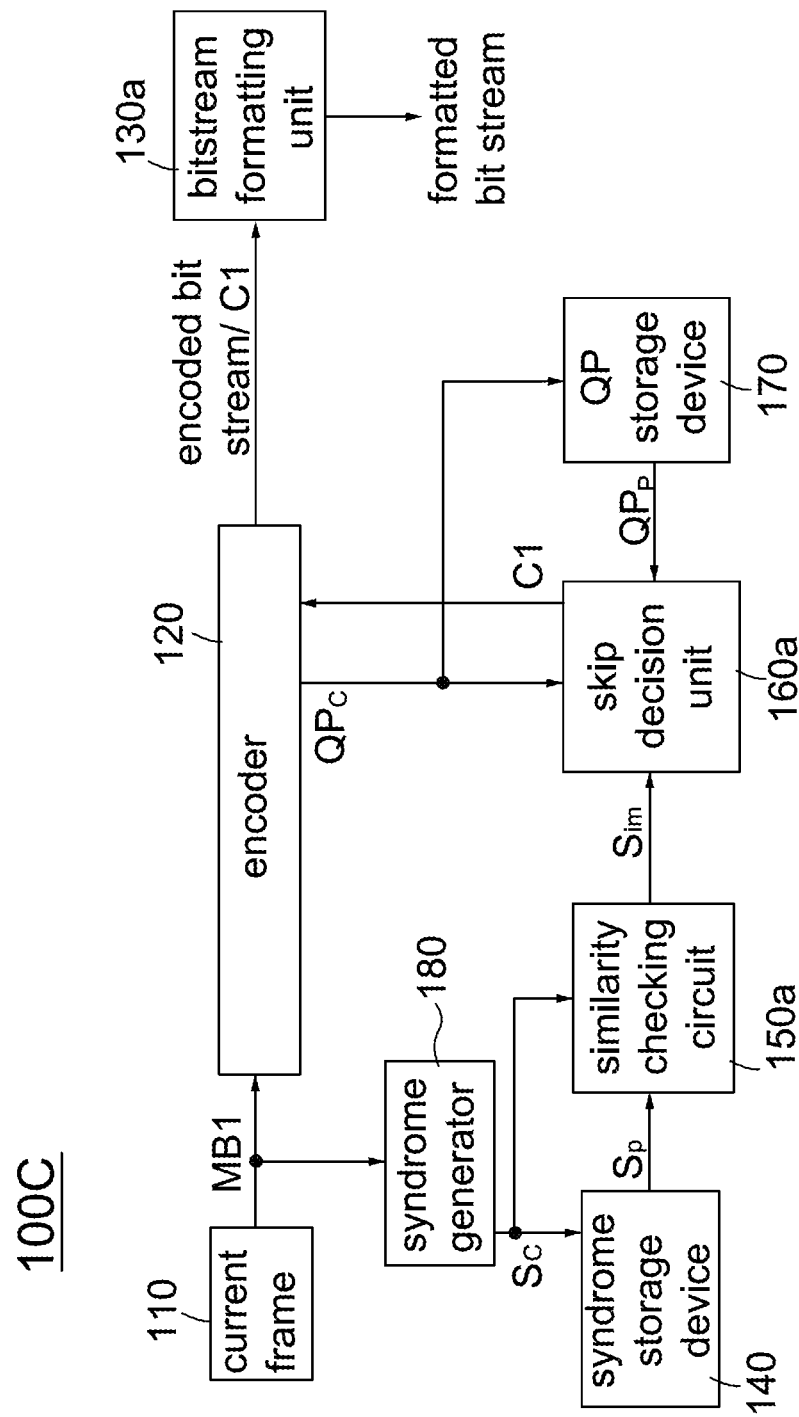
FIG. 1C is a block diagram showing a video encoding apparatus in a bypass configuration according to another embodiment of the invention.

When configured in a single-line configuration, the control signal C1 is provided to the bitstream formatting unit 130a only, and the encoder 120 is always enabled to generate the encoded bit stream as shown in FIG. 1B. If the control signal C1 has a logic value of 1, the bitstream formatting unit 130a sets a skip flag to 1 and assembles the skip flag (excluding the encoded bit stream) into the formatted bit stream, otherwise the bitstream formatting unit 130a sets a skip flag to 0 (i.e., indicating the current macroblock MB1 is not skipped) and assembles the skip flag and the encoded bit stream into the formatted bit stream. When configured in a bypass configuration, the control signal C1 is provided to the encoder 120 only and the encoder 120 bypasses the control signal C1 to the bitstream formatting unit 130a as shown in FIG. 1C. If the control signal C1 has a logic value of 1, the encoder 120 is disabled, and thus the encoder 120 only bypasses the control signal C1 without generating any encoded bit stream to the bitstream formatting unit 130a; the bitstream formatting unit 130a sets a skip flag to 1 and assembles the skip flag into the formatted bit stream. If the control signal C1 has a logic value of 0, the encoder 120 is enabled to generate the encoded bit stream and send the encoded bit stream along with the control signal C1 to the bitstream formatting unit 130a; the bitstream formatting unit 130a sets a skip flag to 0 and assembles the skip flag and the encoded bit stream into the formatted bit stream. Please note that although FIGS. 2, 3A and 4-5A/B only show the dual-line configuration for the control signal C1, the encoder 120 and the bitstream formatting unit 130a/b/c, the single-line configuration and the bypass configuration are also applicable to the video encoding apparatuses 200, 300, 400 and 500.

Referring again to FIG. 1A, the encoder 120 includes a transform unit 121, a quantizer 122, a entropy coder 123 and a rate control unit 124. Depending on the size of the processing blocks, the transform unit 121 may be a discrete cosine transform (DCT) unit, a tile wavelet transform unit or a line-based wavelet transform unit. The transform unit 121 transforms the current macroblock MB1 to generate 256 transform coefficients, and then the quantizer 122 quantizes the transform coefficients on a macroblock-per-macroblock basis according to a quantization parameter ($QP_C$) to generate quantized coefficients. After that, the entropy encoder 123 encodes the quantized coefficients into the encoded bit stream, and then the rate control unit 124 dynamically adjusts the quantization parameter QPc based on the output bitrate from the entropy encoder 123 to achieve a target bitrate. The rate control unit 124 allocates a budget of bits to each macroblock. The quantization parameter QPc is provided to the quantizer 122, the skip decision unit 160a and the QP storage device 170. The syndrome storage device 140 and the QP storage device 170 may be implemented with SRAM (static random-access memory) buffers or DRAM (dynamic random-access memory) buffers. Throughout the specification, the same components with the same function are designated with the same reference numerals.

Figure 2:
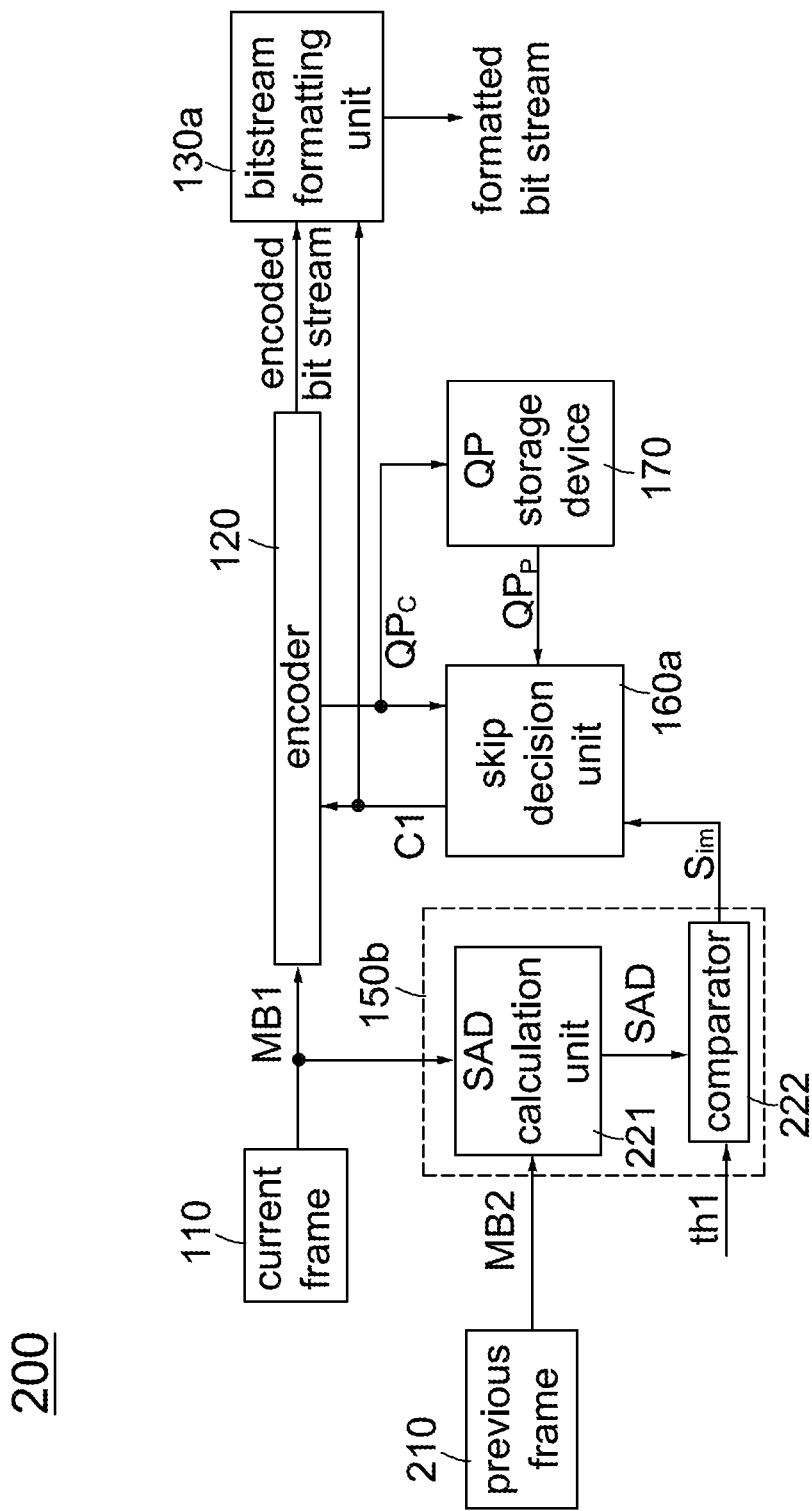
FIG. 2 is a block diagram showing a video encoding apparatus according to another embodiment of the invention.

FIG. 2 is a block diagram showing a video encoding apparatus according to another embodiment of the invention. Referring to FIG. 2, the video encoding apparatus 200 of the invention, operating in I-I-I mode, includes an encoder 120, a bitstream formatting unit 130a, a similarity checking circuit 150b, a skip decision unit 160a, and a QP storage device 170. The video encoding apparatus 200 is used to receive a current macroblock MB1 of a current frame 110 and a previous macroblock MB2 of a previous frame 210, determine whether to encode the current macroblock MB1, and generate a formatted bit stream. In the video encoding apparatus 200, modification is found in the addition of a similarity checking circuit 150b, while the syndrome storage device 140, the similarity checking circuit 150a and a syndrome generator 180 are excluded.

The similarity checking circuit 150b includes a SAD calculation unit 221 and a comparator 222. The SAD calculation unit 221 receives a current macroblock MB1 in a current frame 110 and a corresponding macroblock MB2 (i.e., residing at the same location in a previous frame 210 as the current macroblock MB1 in the current frame 110) in the previous frame 210, calculates the sum of absolute differences (SAD) of the pixel values within the current macroblock MB1 relative to the corresponding macroblock MB2 and generates a SAD value. The comparator 222 compares the SAD value and a threshold value th1 to generate a checking output Sim. In one embodiment, as the output of the similarity checking circuit 150a, the output Sim (from the comparator 222) with a logic value of 1 represents the two macroblocks MB1 and MB2 have similar contents, and the output Sim with a logic value of 0 represents the two macroblocks MB1 and MB2 have totally different contents. The description of the same components in FIGS. 1A and 2 are omitted herein. The difference between FIGS. 1A and 2 is that the syndromes (CRC/checksum/Hash) between corresponding macroblocks in adjacent frames are used for similarity checking in FIG. 1A while the SAD values between corresponding macroblocks in adjacent frames are used for similarity checking in FIG. 2.

Figure 3A:
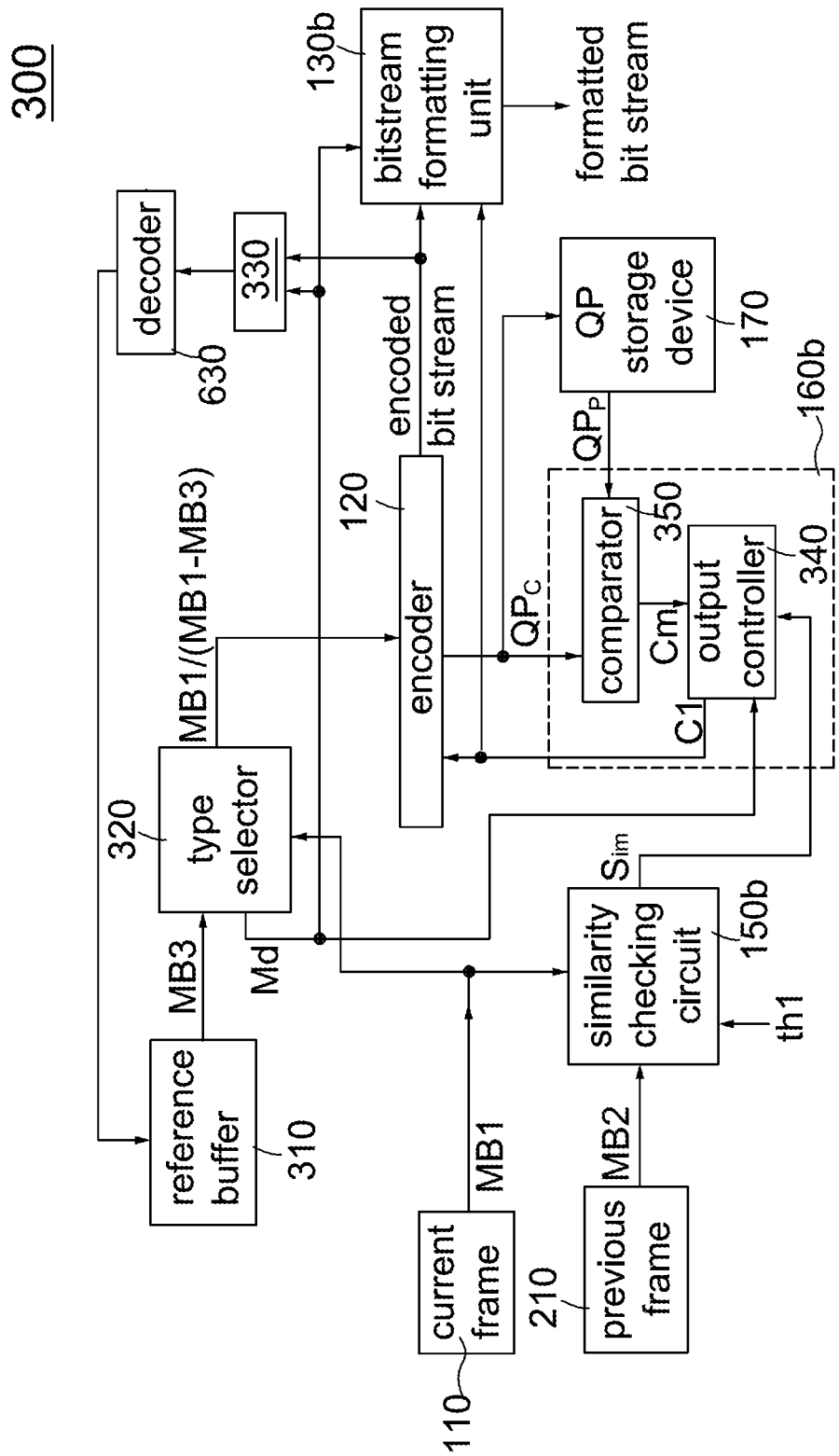
FIG. 3A is a block diagram showing a video encoding apparatus according to another embodiment of the invention.

FIG. 3A is a block diagram showing a video encoding apparatus according to another embodiment of the invention. Referring to FIG. 3A, the video encoding apparatus 300 of the invention, operating in I-P-P mode, includes an encoder 120, a bitstream formatting unit 130b, a similarity checking circuit 150b, a skip decision unit 160b, a type selector 320, a update controller 330, a reference buffer 310, a decoder 630 and a QP storage device 170. The video encoding apparatus 300 is used to receive a current macroblock MB1 of a current frame 110, a corresponding macroblock MB2 of a previous frame 210 and a corresponding macroblock MB3 of a reference frame stored in the reference buffer 310, determine whether to encode the current macroblock MB1 or the difference (MB1-MB3), and generate a formatted bit stream. Here, the corresponding macroblocks MB2 and MB3 respectively reside at the same location in the previous frame 210 and the reference frame as the current macroblock MB1 in the current frame 110.

Figure 3B:
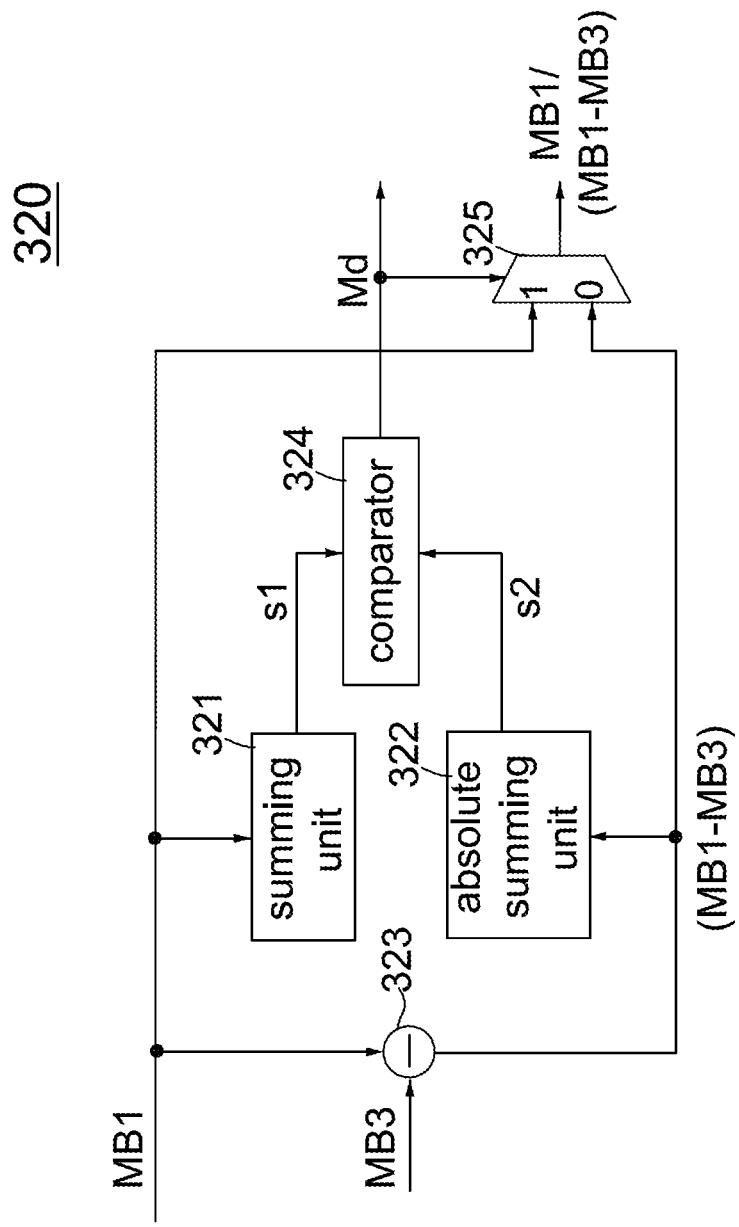
FIG. 3B is a schematic diagram showing a type selector according to an embodiment of the invention.

FIG. 3B is a schematic diagram showing a type selector according to an embodiment of the invention. Referring to FIG. 3B, the type selector 320 includes a subtractor 323, a summing unit 321, an absolute summing unit 322, a comparator 324 and a multiplexer 325. The summing unit 321 calculates the sum of pixel values in the current macroblock MB1 to generate a sum value s1. The subtractor 323 subtracts a corresponding macroblock MB3 from the current macroblock MB1 on a pixel-by-pixel basis and generates a difference macroblock (MB1-MB3) with 256 difference values. The absolute summing unit 322 calculates the sum of absolute values of the 256 difference values in the difference macroblock (MB1-MB3) to generate a sum value s2. The comparator 324 compares the two sum values s1 and s2 to generate a block-type signal Md and then supplies the Md signal to the bitstream formatting unit 130b, the update controller 330 and the skip decision unit 160b. In one embodiment, the Md signal with a logic value of 1 represents the current macroblock MB1 is an I-macroblock, i.e., s1<s2, and the Md signal with a logic value of 0 represents the current macroblock MB1 is a P-macroblock, i.e., s1>s2. The multiplexer 325 outputs one of the current macroblock MB1 and the difference macroblock (MB1-MB3) according to the Md signal. If the Md signal has a logic value of 1 (i.e., MB1 is an 1-macroblock), the multiplexer 325 supplies the current macroblock MB1 to the encoder 120, otherwise the multiplexer 325 supplies the difference macroblock (MB1-MB3) to the encoder 120.

Figure 4:
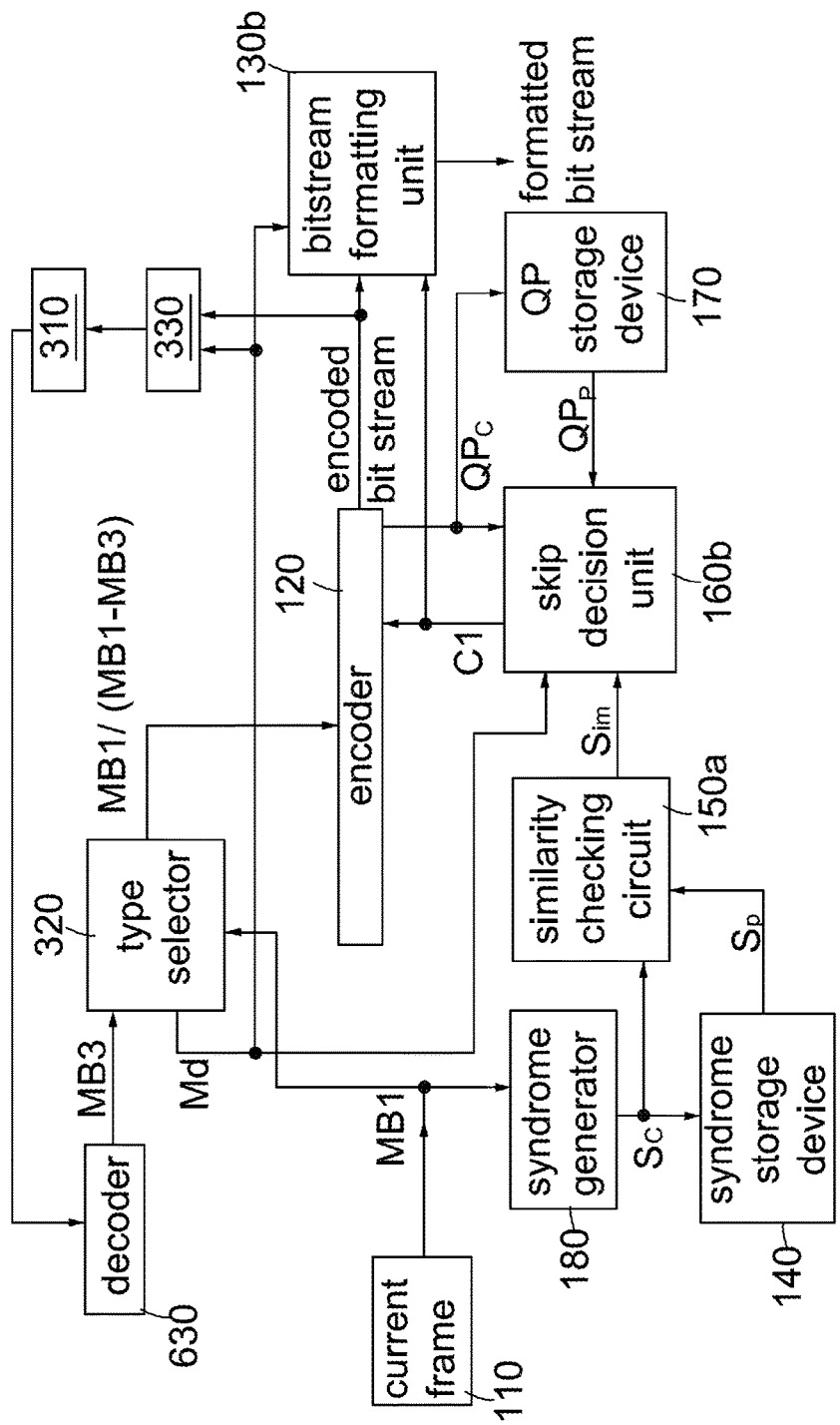
FIG. 4 is a block diagram showing a video encoding apparatus according to another embodiment of the invention.

Referring again to FIG. 3A, please note that in addition to setting the skip flag (please refer to the description related to FIG. 1A), the bitstream formatting unit 130b also sets a type flag according to the Md signal and then assembles the skip flag, the type flag and the encoded bit stream into the formatted bit stream. In one embodiment, if the Md signal has a logic value of 1, the bitstream formatting unit 130b sets a type flag to 1 (i.e., indicating the current macroblock MB1 is an I-macroblock), otherwise the bitstream formatting unit 130b sets a type flag to 0 (i.e., indicating the current macroblock MB1 is a P-macroblock); finally, the bitstream formatting unit 130b assembles the skip flag and the type flag with/without the encoded bit stream into the formatted bit stream. If the Md signal has a logic value of 1, the update controller 330 is enabled to feed the encoded bit stream to the decoder 630 and the decoder 630 decodes the encoded bit stream into decoded data and then updates the reference frame in the reference buffer 310 with the decoded data at its corresponding location, otherwise the update controller 330 is disabled. The skip decision unit 160b includes an output controller 340 and a comparator 350. The comparator 350 compares the quantization value (QPc) of the current macroblock MB1 and that (QPp) of a corresponding macroblock MB2 from the QP storage device 170 to generate an output signal Cm. If the Md signal has a logic value of 1 (indicating the current macroblock MB1 is an I-macroblock), the output controller 340 directly generates the control signal C1 with a logic value of 0. If the Md signal has a logic value of 0 (indicating the current macroblock MB1 is a P-macroblock), the output controller 340 generates the control signal C1 with one of two logic values 0/1 according to the output signal Cm. For example, if the Md signal has a logic value of 0 and QPc>=QPp (indicating the image quality of the current macroblock MB1 is less than or equal to that of the corresponding macroblock MB2), the output controller 340 generates the control signal C1 with a logic value of 1 to skip encoding of the current macroblock MB1; if the Md signal has a logic value of 0 and QPc<QPp (indicating the image quality of the current macroblock MB1 is greater than that of the corresponding macroblock MB2), the output controller 340 generates the control signal C1 with a logic value of 0 to encode the current macroblock MB1. The detailed block diagram and function of the decoder 630 will be described below in connection with FIG. 6. In an alternative embodiment, locations of the reference buffer 310 and the decoder 630 are swapped as shown in FIG. 4. The descriptions of the same components in FIGS. 1A, 2 and 3A are omitted herein.

FIG. 4 is a block diagram showing a video encoding apparatus according to another embodiment of the invention. Referring to FIG. 4, the video encoding apparatus 400 of the invention, operating in I-P-P mode, includes an encoder 120, a bitstream formatting unit 130b, a syndrome storage device 140, a similarity checking circuit 150a, a skip decision unit 160b, a QP storage device 170, a syndrome generator 180, a type selector 320, a reference buffer 310, a decoder 630 and a update controller 330. The video encoding apparatus 400 is used to receive a current macroblock MB1 of a current frame 110 and a corresponding macroblock MB3 of a reference frame, determine whether to encode the current macroblock MB1 or the difference macroblock (MB1-MB3), and generate a formatted bit stream. Here, the reference buffer 310 stores the reference frame in a bit stream format and the corresponding macroblock MB3 reside at the same location in the reference frame as the current macroblock MB1 in the current frame 110. In an alternative embodiment, locations of the reference buffer 310 and the decoder 630 are swapped as shown in FIG. 3A. All the components in FIG. 4 are introduced in FIGS. 1A, 2, 3A-3B, and thus their descriptions are omitted herein. However, the circuit architecture of FIG. 4 is different from those of FIGS. 1A, 2 and 3A.

Figure 5A:
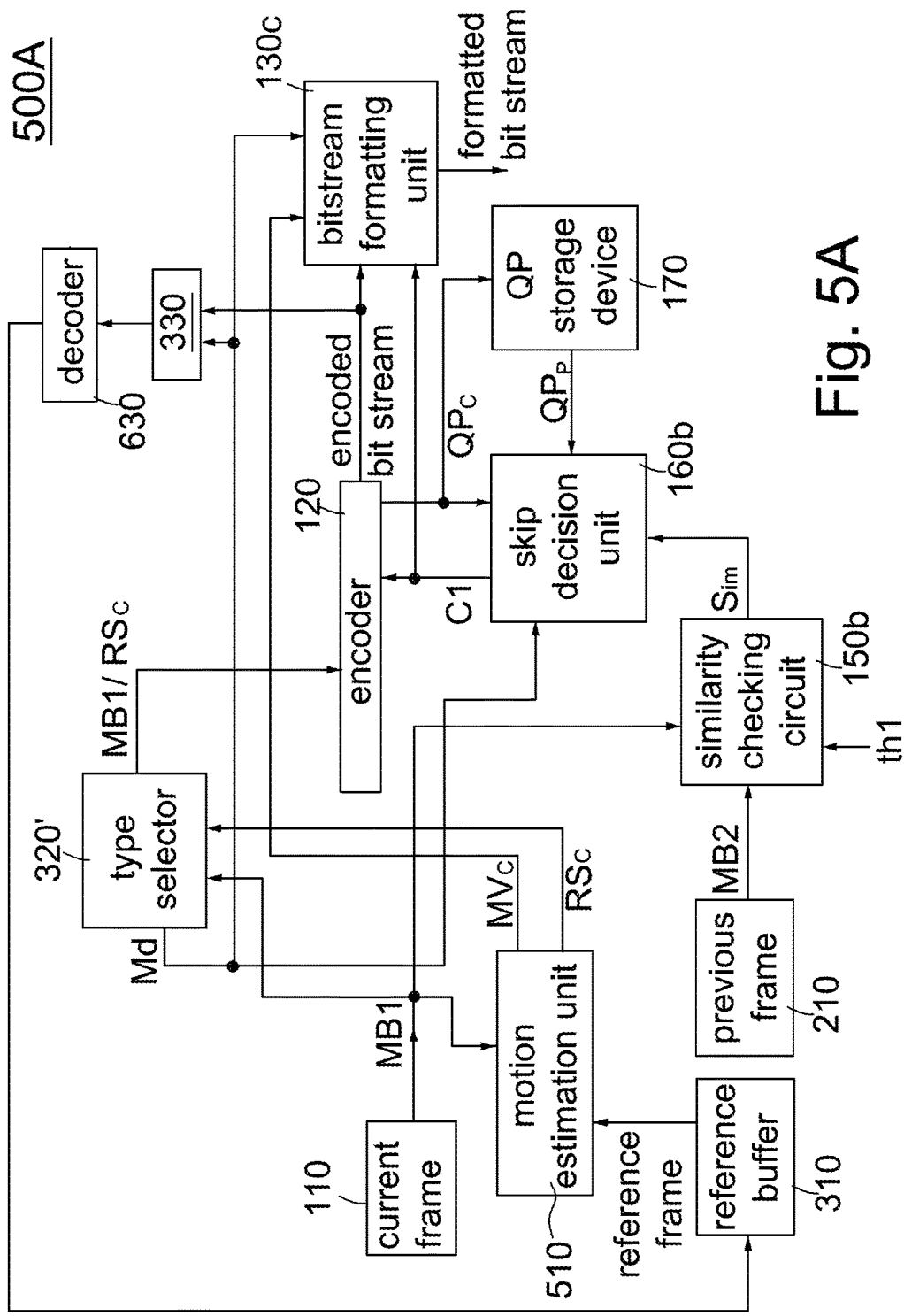
FIG. 5A is a block diagram showing a video encoding apparatus according to another embodiment of the invention.

FIG. 5A is a block diagram showing a video encoding apparatus according to another embodiment of the invention. Referring to FIG. 5A, the video encoding apparatus 500A of the invention, operating in I-P-P mode, includes an encoder 120, a bitstream formatting unit 130c, a similarity checking circuit 150b, a skip decision unit 160b, a motion estimation unit 510, a QP storage device 170, a type selector 320', a reference buffer 310, a decoder 630 and a update controller 330. The video encoding apparatus 500A is used to receive a current macroblock MB1 of a current frame 110, a reference frame and a corresponding macroblock MB2 of a previous frame 210, determine whether to encode the current macroblock MB1 or a current residual RSc, and generate a formatted bit stream. Here, the corresponding macroblock MB2 resides at the same location in the previous frame 210 as the current macroblock MB1 in the current frame 110. The descriptions of the same components in FIGS. 1A, 2, 3A and 4 are omitted herein.

Figure 3C:
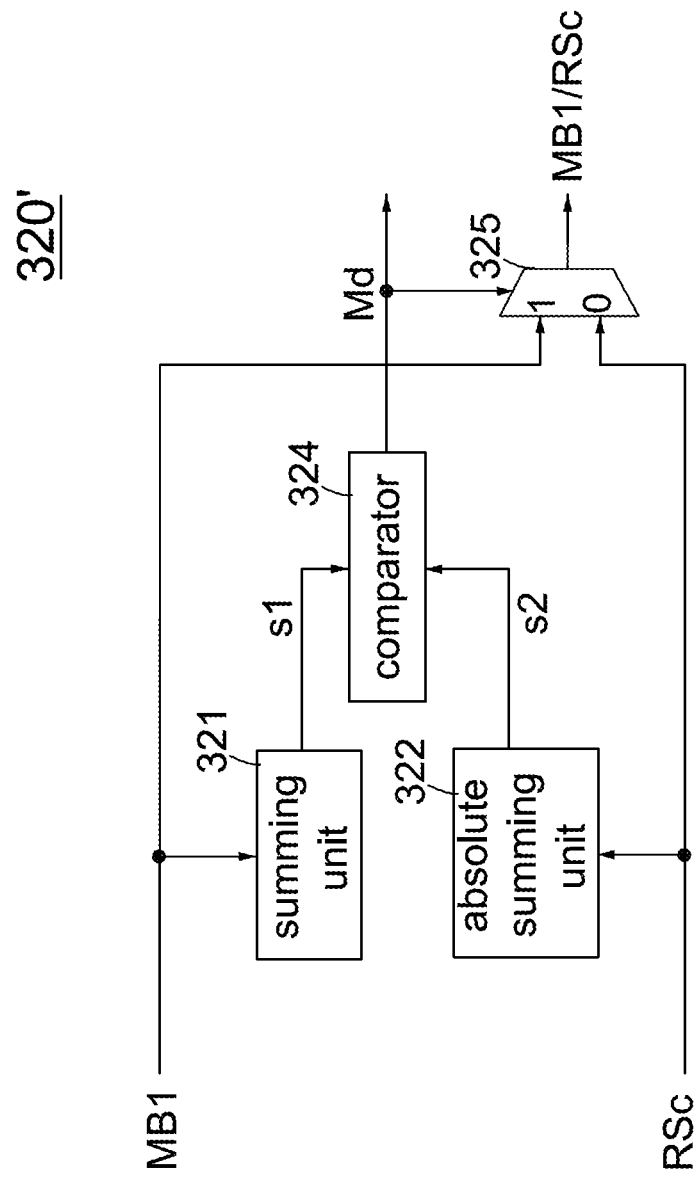
FIG. 3C is a schematic diagram showing a type selector according to another embodiment of the invention.

The motion estimation unit 510 compares the current macroblock MB1 with a preset search area established in the reference frame from the reference buffer 310 to generate a current motion vector MVc for the best matching macroblock in the reference frame, and then substracts the best matching macroblock from the current macroblock MB1 to generate a current residual RSc. The motion estimation unit 510 delivers the current motion vector MVc for the current macroblock MB1 to the bitstream formatting unit 130c and the current residual RSc for the current macroblock MB1 to the type selector 320'. The type selector 320' has similar function as the type selector 320. Referring to FIG. 3C, the type selector 320' includes a summing unit 321, an absolute summing unit 322, a comparator 324 and a multiplexer 325. In one embodiment, the Md signal with a logic value of 1 represents the current macroblock MB1 is an I-macroblock, e.g., s1<s2, and the Md signal with a logic value of 0 represents the current macroblock MB1 is a P-macroblock, e.g. s1>s2. The multiplexer 325 outputs one of the current macroblock MB1 and the current residual RSc according to the Md signal. If the Md signal has a logic value of 1 (i.e., MB1 is an I-macroblock), the multiplexer 325 supplies the current macroblock MB1 to the encoder 120, otherwise the multiplexer 325 supplies the current residual RSc to the encoder 120.

Referring again to FIG. 5A, please note that in addition to setting the skip flag and the type flag, the bitstream formatting unit 130c assembles the skip flag and the type flag, with/without the current motion vector MVc and the encoded bit stream into the formatted bit stream. In one embodiment, if the Md signal has a logic value of 1, it indicates the current macroblock MB1 is an I-macroblock, the bitstream formatting unit 130c assembles the skip flag, the type flag with/without the encoded bit stream (without the current motion vector MVc) into the formatted bit stream. Otherwise, if the Md signal has a logic value of 0, it indicates the current macroblock MB1 is a P-macroblock, the bitstream formatting unit 130c assembles the skip flag, the type flag and the current motion vector MVc with/without the encoded bit stream into the formatted bit stream.

Figure 5B:
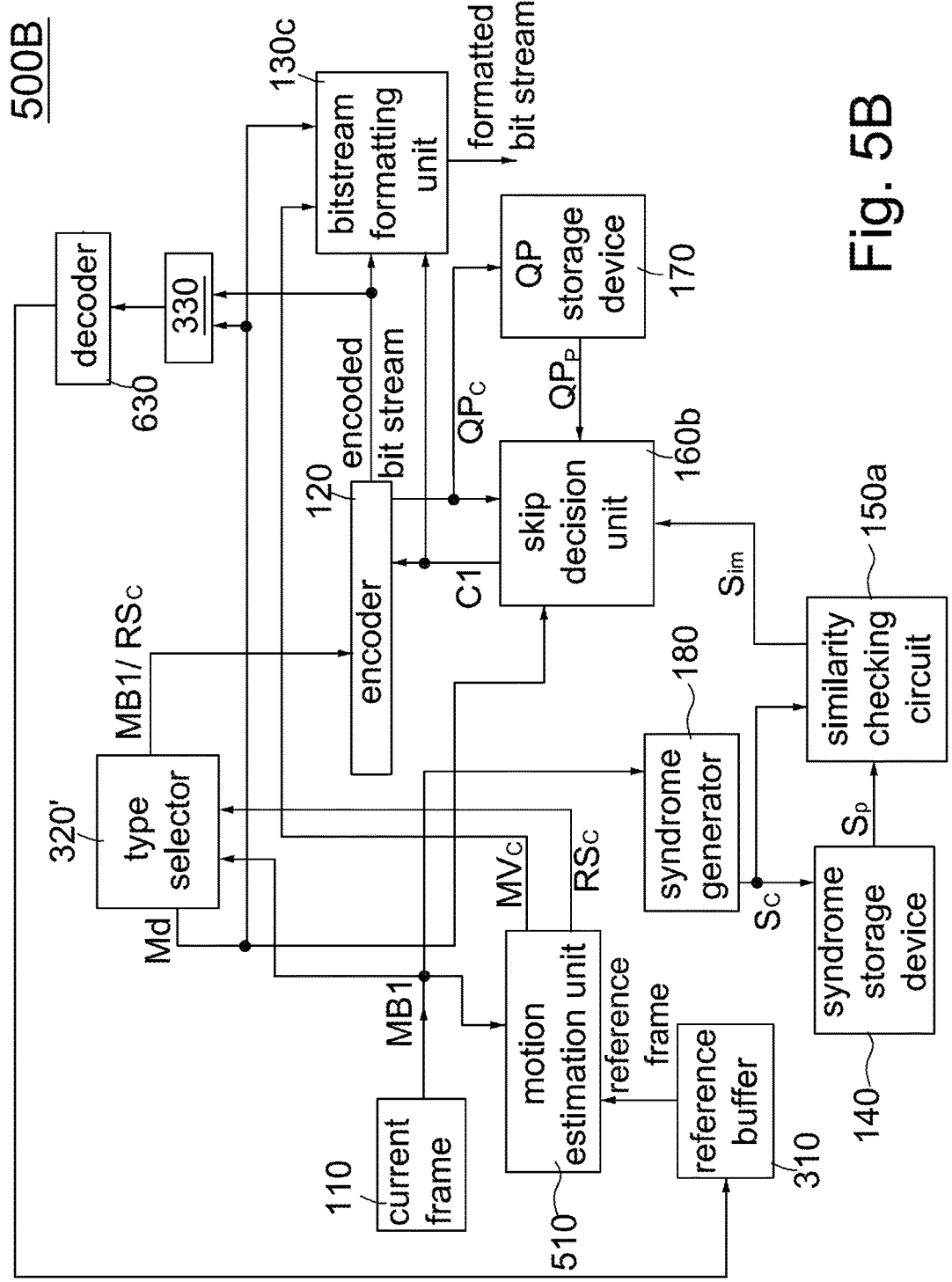
FIG. 5B is a block diagram showing a video encoding apparatus according to another embodiment of the invention.

FIG. 5B is a block diagram showing a video encoding apparatus according to another embodiment of the invention. Referring to FIG. 5B, the video encoding apparatus 500B of the invention, operating in I-P-P mode, includes an encoder 120, a bitstream formatting unit 130c, a syndrome storage device 140, a similarity checking circuit 150a, a skip decision unit 160b, a QP storage device 170, a syndrome generator 180, a reference buffer 310, a type selector 320', a update controller 330, a motion estimation unit 510 and a decoder 630. The video encoding apparatus 500B is used to receive a current macroblock MB1 of a current frame 110 and a reference frame, determine whether to encode the current macroblock MB1 or a current residual RSc, and generate a formatted bit stream. The descriptions of the same components in FIGS. 1A, 2, 3A, 4 and 5A are omitted herein. Please note that locations of the reference buffer 310 and the decoder 630 in FIGS. 5A-5B may be swapped as shown in FIG. 4.

Please note that although there is no motion estimation unit in FIGS. 3A and 4, the apparatuses in FIGS. 3A and 4 may be regarded as two special cases for the motion vector MVc equal to 0 in cooperation with the motion estimation unit 510 in FIGS. 5A and 5B. In this scenario, the difference macroblock (MB1-MB3) outputted from the type selector 320 is also a special case for the current residual RSc from the type selector 320'. It is because when the motion vector MVc is equal to 0 in FIGS. 5A and 5B, it is inevitable that the current macroblocks MB1 and the corresponding MB3 respectively reside at the same location in the current frame 110 and the reference frame.

Figure 6:
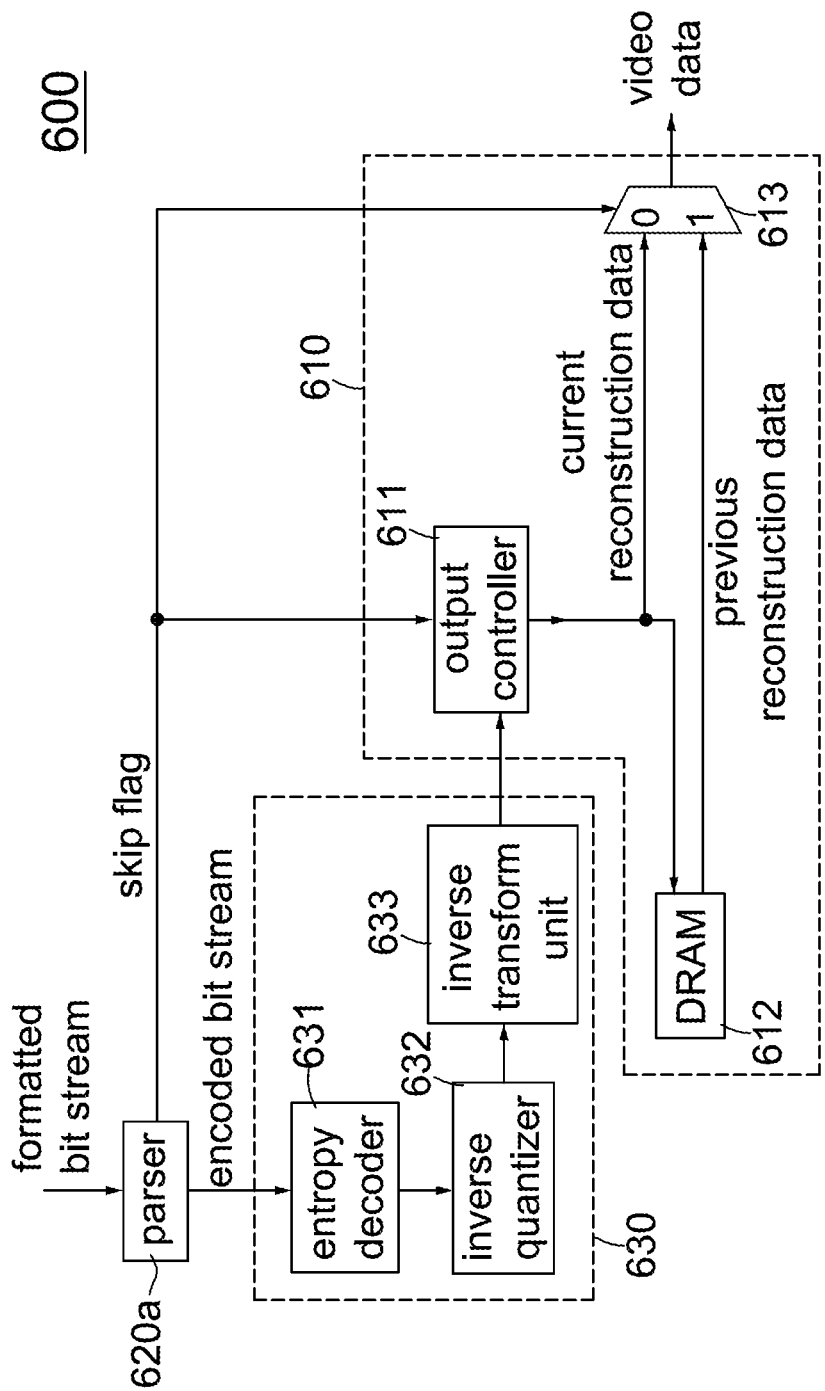
FIG. 6 is a block diagram showing a video decoding apparatus according to one embodiment of the invention.

FIG. 6 is a block diagram showing a video decoding apparatus according to one embodiment of the invention. The video decoding apparatus 600/700/800/900 is used to receive a formatted bit stream from a receiver 1050 and generate video reconstruction data for use in a display 1070 (see FIG. 10 below). Specifically, the video decoding apparatus 600/700 separates the formatted bit stream into an encoded bit stream and a skip flag and reconstructs a current macroblock from one of the encoded bit stream and a DRAM buffer 612 (stores a reference frame in a bit stream/reconstruction data format) according to the skip flag. Referring to FIG. 6, a video decoding apparatus 600 of the invention, operating in I-I-I mode, includes a storage and selection output circuit 610, a parser 620a and a decoder 630. The parser 620a parses a formatted bit stream from a receiver 1050 and separates the formatted bit stream into an encoded bit stream and a skip flag. The decoder 630 includes an entropy decoder 631, the inverse quantization circuit 632 and the inverse transform unit 633. The entropy decoder 631 receives the encoded bit stream and decodes the encoded bit stream into quantized transformed data. The inverse quantization circuit 632 performs inverse quantization on the quantized transformed data to generate de-quantized transformed data. The inverse transform unit 633 performs inverse transform on the de-quantized transformed data to generate current reconstruction data.

The storage and selection output circuit 610 includes an output controller 611, a DRAM 612 and a multiplexer 613. The DRAM 612 stores reconstruction data for a reference frame. The skip flag serves as a control signal in the output controller 611 and the multiplexer 613. In one embodiment, if the skip flag is set to 1 (i.e., indicating the current macroblock MB1 is skipped), the output controller 611 is disabled without outputting any data, and the multiplexer 613 outputs the previous reconstruction data from the DRAM 612 as the video data according to the location of the current macroblock MB1 in the current frame; if the skip flag is set to 0 (i.e., indicating the current macroblock MB1 is not skipped), the output controller 611 stores the current reconstruction data from the decoder 630 to the DRAM 612 according to the location of the current macroblock MB1 in the current frame and the multiplexer 613 outputs the current reconstruction data as the video data.

Figure 7:
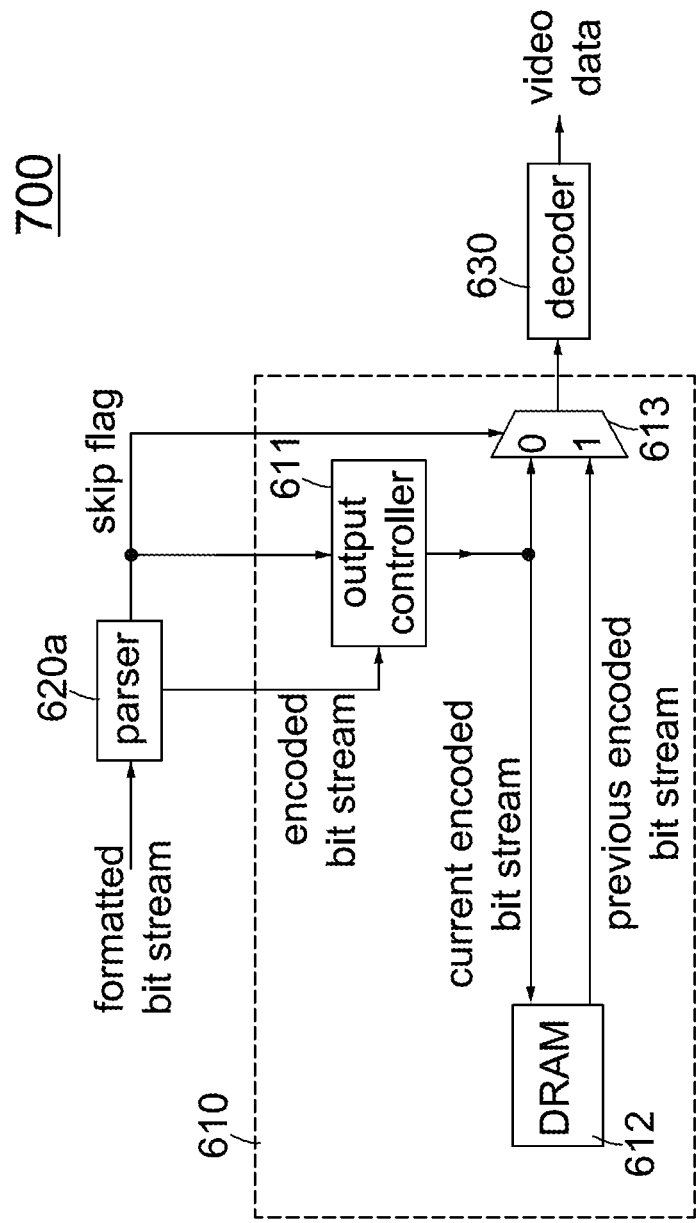
FIG. 7 is a block diagram showing a video decoding apparatus according to another embodiment of the invention.

FIG. 7 is a block diagram showing a video decoding apparatus according to another embodiment of the invention. Comparing FIGS. 6 and 7, the video decoding apparatuses 600 and 700 have the same components, but have different circuit connections. Specifically, the DRAM 612 in FIG. 6 stores the reconstruction data for a reference frame while the DRAM 612 in FIG. 7 stores the reference frame in a bit stream format. Accordingly, in comparison with the video decoding apparatus 600, the video decoding apparatus 700 saves the DRAM bandwidth. The video decoding apparatus 700 operates in I-I-I mode.

Figure 8:
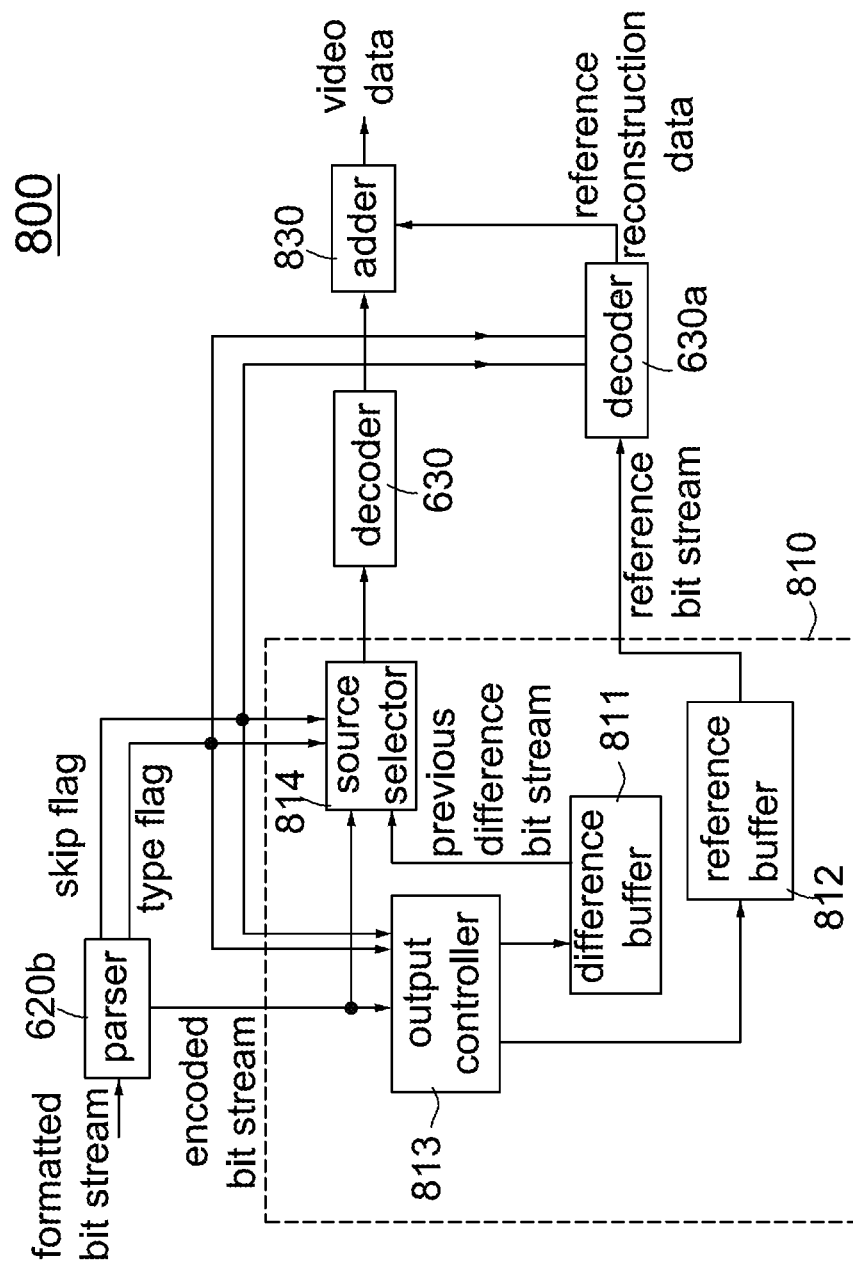
FIG. 8 is a block diagram showing a video decoding apparatus according to another embodiment of the invention.

FIG. 8 is a block diagram showing a video decoding apparatus according to another embodiment of the invention. The video decoding apparatus 800/900 separates a formatted bit stream into an encoded bit stream, a skip flag and a type flag and reconstructs a current macroblock from at least one of the encoded bit stream, the reference buffer 812 (stores I-macroblocks for each frame in a bit stream/reconstruction data format) and the difference buffer 811 (stores P-macroblocks for each frame in a bit stream/reconstruction data format) according to the skip flag and the type flag. Referring to FIG. 8, a video decoding apparatus 800 of the invention, operating in I-P-P mode, includes a storage and selection output circuit 810, a parser 620b, two decoders 630/630a and an adder 830. The parser 620b parses a formatted bit stream from a receiver 1030 and separates the formatted bit stream into an encoded bit stream, a skip flag and a type flag. The decoder 630a includes all the functions of the decoder 630 except that the activation of the decoder 630a is controlled by the skip flag and the type flag.

The storage and selection output circuit 810 includes an output controller 813, a source selector 814, a difference buffer 811 and a reference buffer 812. The skip flag and the type flag serves as control signals in the output controller 813, the source selector 814 and the decoder 630a. In response to the skip flag and the type flag, the output controller 813 determines whether to deliver the encoded bit stream to one of the difference buffer 811 and the reference buffer 812, the source selector 814 determines whether to deliver one of the encoded bit stream and the previous difference bit stream to the decoder 630, and the decoder 630a determines whether to decode the reference bit stream into reference reconstruction data. In one embodiment, if the skip flag is set to 1 (i.e., indicating the current macroblock MB1 is skipped) and the type flag is set to 1 (i.e., indicating it is an I-macroblock), the output controller 813 and the source selector 814 are disabled without outputting any data; the decoder 630a is enabled to decode the reference bit stream from the reference buffer 812 (based on the location of the current macroblock MB1 in the current frame) into the reference reconstruction data; finally, the adder 830 outputs the reference reconstruction data as the video data. If the skip flag is set to 0 (i.e., indicating the current macroblock MB1 is not skipped) and the type flag is set to 1 (i.e., indicating the current macroblock MB1 is an I-macroblock), the output controller 813 delivers the encoded bit stream to the reference buffer 812 and the encoded bit stream are stored in the reference buffer 812 according to the location of the current macroblock MB1 in the current frame; the decoder 630a is disabled; the source selector 814 delivers the encoded bit stream to the decoder 630; the decoder 630 decodes the encoded bit stream into reference reconstruction data; finally, the adder 830 outputs the reference reconstruction data as the video data. If the skip flag is set to 1 and the type flag is set to 0 (i.e., indicating the current macroblock MB1 is a P-macroblock), the output controller 813 is disabled and outputs no data; the decoder 630a is enabled to decode the reference bit stream from the reference buffer 812 (based on the location of the current macroblock MB1 in the current frame) into reference reconstruction data; the source selector 814 delivers the previous difference bit stream from the difference buffer 811 (based on the location of the current macroblock MB1 in the current frame) to the decoder 630; the decoder 630 decodes the previous difference bit stream into previous difference data; finally, the adder 830 adds the reference reconstruction data and the previous difference data to generate the video data. If the skip flag is set to 0 and the type flag is set to 0, the output controller 813 delivers the encoded bit stream to the difference buffer 811 and the encoded bit stream is stored in the difference buffer 811 according to the location of the current macroblock MB1 in the current frame; the decoder 630a is enabled to decode the reference bit stream from the reference buffer 812 (according to the location of the current macroblock MB1 in the current frame) into the reference reconstruction data; the source selector 814 delivers the encoded bit stream to the decoder 630; the decoder 630 decodes the encoded bit stream into current difference data; finally, the adder 830 adds the reference reconstruction data and the current difference data to generate the video data.

Figure 9:
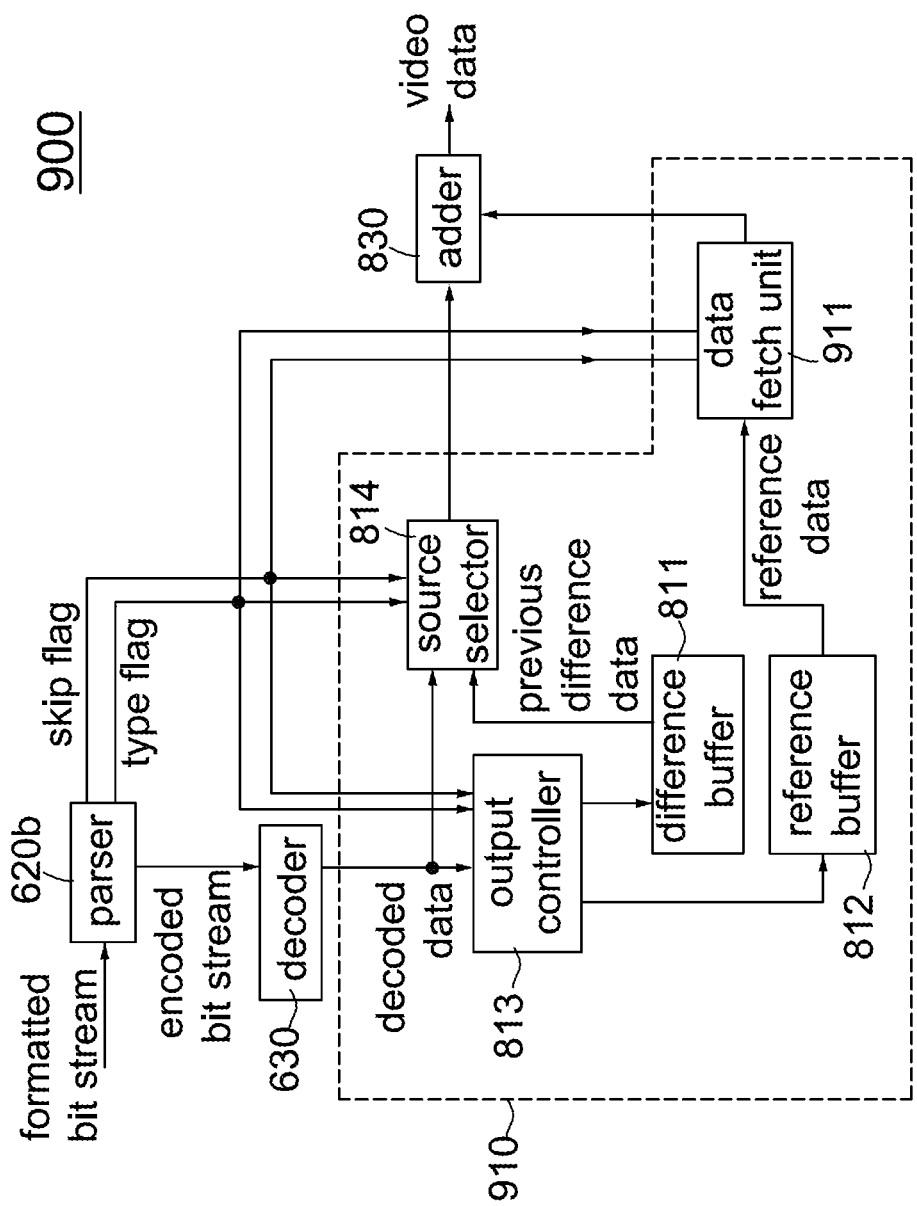
FIG. 9 is a block diagram showing a video decoding apparatus according to another embodiment of the invention.

FIG. 9 is a block diagram showing a video decoding apparatus according to another embodiment of the invention. Referring to FIG. 9, a video decoding apparatus 900, operating in I-P-P mode, includes a storage and selection output circuit 910, a parser 620b, a decoder 630, and an adder 830. Comparing FIGS. 8 and 9, the video decoding apparatuses 800 and 900 have similar components, but have different circuit connections. Specifically, the difference buffer 811 and the reference buffer 812 in FIG. 8 store the encoded bit streams while the difference buffer 811 and the reference buffer 812 in FIG. 9 store the reconstruction data. Accordingly, in comparison with the video decoding apparatus 900, the video decoding apparatus 800 saves the memory bandwidth.

The decoder 630 decodes the encoded bit stream from the parser 620b to generate decoded data. The storage and selection output circuit 910 includes an output controller 813, a source selector 814, a difference buffer 811, a reference buffer 812 and a data fetch unit 911. The skip flag and the type flag serves as control signals in the output controller 813, the source selector 814 and the data fetch unit 911.

In response to the skip flag and the type flag, the output controller 813 determines whether to deliver the decoded data to one of the difference buffer 811 and the reference buffer 812, the source selector 814 determines whether to deliver one of the decoded data and the previous difference data to the adder 830, and the data fetch unit 911 determines whether to deliver the reference data to the adder 830. In one embodiment, if the skip flag is set to 1 (i.e., indicating the current macroblock MB1 is skipped) and the type flag is set to 1 (i.e., indicating the current macroblock MB1 is an I-macroblock), the output controller 813 and the source selector 814 are disabled without outputting any data, the data fetch unit 911 delivers the reference data from the reference buffer 812 (according to the location of the current macroblock MB1 in the current frame) to the adder 830, and then the adder 830 outputs the reference data as the video data. If the skip flag is set to 0 (i.e., indicating the current macroblock MB1 is not skipped) and the type flag is set to 1, the output controller 813 delivers the decoded data to the reference buffer 812 and the decoded data is stored in the reference buffer 812 according to the location of the current macroblock MB1 in the current frame; the source selector 814 delivers the decoded data to the adder 830; finally, the adder 830 outputs the decoded data as the video data. If the skip flag is set to 1 and the type flag is set to 0 (i.e., indicating the current macroblock MB1 is a P-macroblock), the output controller 813 is disabled without outputting any data; the source selector 814 delivers the previous difference data from the difference buffer 811 (based on the location of the current macroblock MB1 in the current frame) to the adder 830; the data fetch unit 911 is enabled to deliver the reference data from the reference buffer 812 (based on the location of the current macroblock MB1 in the current frame) to the adder 830; finally, the adder 830 adds the reference data and the previous difference data to generate the video data. If the skip flag is set to 0 and the type flag is set to 0, the output controller 813 delivers the decoded data to the difference buffer 811 and the decoded data is stored in the difference buffer 811 according to the location of the current macroblock MB1 in the current frame; the source selector 814 delivers the decoded data to the adder 830; the data fetch unit 911 is enabled to deliver the reference data from the reference buffer 812 (based on the location of the current macroblock MB1 in the current frame) to the adder 830; finally, the adder 830 adds the reference data and the decoded data to generate the video data.

Figure 10:
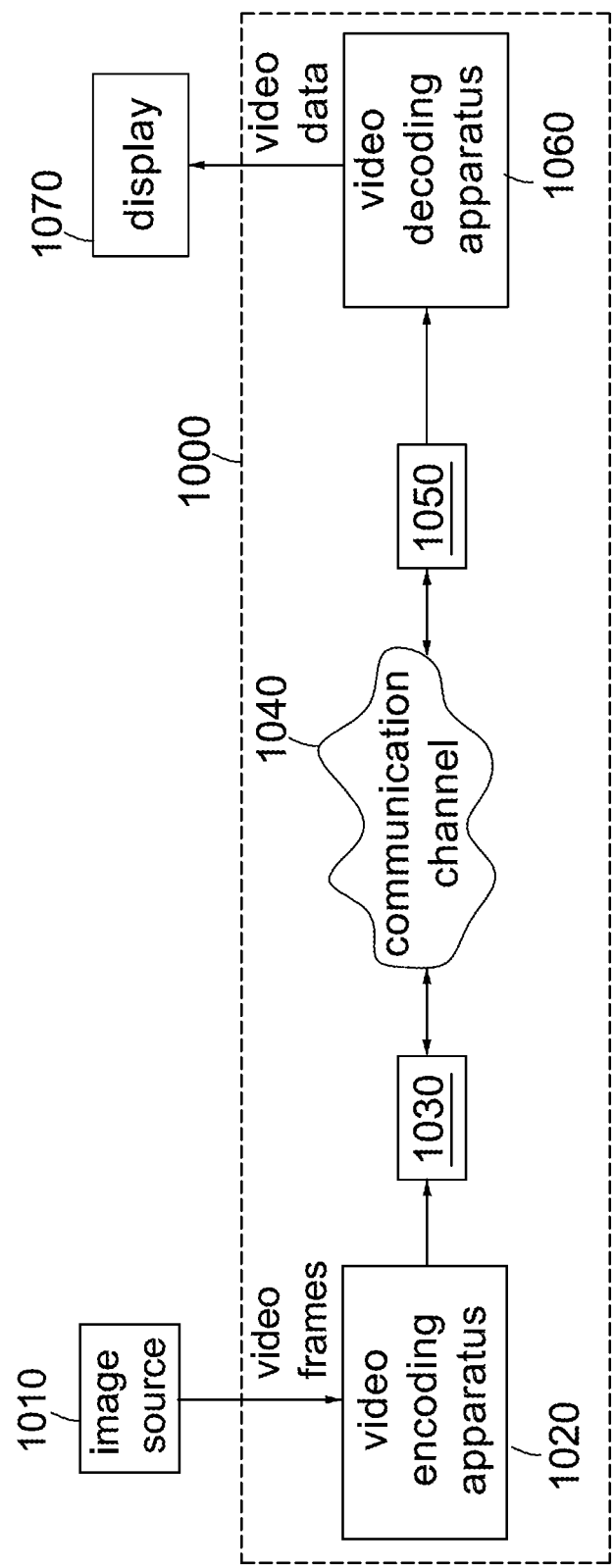
FIG. 10 is a block diagram showing a video transmission system with a skip scheme according to one embodiment of this invention.

FIG. 10 is a block diagram showing a video transmission system with a skip scheme according to one embodiment of this invention. Referring to FIG. 10, a video transmission system 1000 with a skip scheme includes a video encoding apparatus 1020, a transmitter 1030, a communication channel 1040, a receiver 1050 and a video decoding apparatus 1060. An image source 1010 supplies a sequence of video frames to the video encoding apparatus 1020, and each video frame comprises a plurality of processing blocks. The video encoding apparatus 1020 encodes each processing block into a formatted bit stream and then transmits the formatted bit stream to the transmitter 1030. The transmitter 1030 transforms the formatted bit stream into data packets and then transmits the data packets to the receiver 1050 via the communication channel 1040. The communication channel 1040 is a network channel, where the communication between the transmitter 1030 and the receiver 1050 is conducted through packet exchange. The receiver 1050 receives data packets from the communication channel 1040, transforms the data packets into the formatted bit stream and then transmits the formatted bit stream to the video decoding apparatus 1060. Afterward, the video decoding apparatus 1060 decodes the formatted bit stream into video data (reconstruction data) and then the video data is presented on the display 1070. Please be noted that although shown separately, the video encoding apparatus 1020 and the transmitter 1030 may be integrally formed and functioned as a single component. Likewise, the receiver 1050 and the video decoding apparatus 1060 may also be integrally formed and functioned as a single component.

The video encoding apparatuses 100A/B/C and 200 in FIGS. 1A-1C and 2 operate in I-I-I mode while the video encoding apparatuses 300, 400 and 500 A/B in FIGS. 3A, 4-5A/B operate in I-P-P mode. The video decoding apparatuses 600 and 700 in FIGS. 6-7 operate in I-I-I mode while the video decoding apparatuses 800 and 900 in FIGS. 8-9 operate in I-P-P mode. Accordingly, when the video transmission system 1000 operates in I-I-I mode, the video encoding apparatus 1020 is implemented by one of the video encoding apparatuses 100A/B/C and 200, and the video decoding apparatus 1060 is implemented by one of the video decoding apparatuses 600 and 700. Alternatively, when the video transmission system 1000 operates in I-P-P mode, the video encoding apparatus 1020 is implemented by one of the video encoding apparatuses 300, 400 and 500 A/B, and the video decoding apparatus 1060 is implemented by one of the video decoding apparatuses 800 and 900.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A video transmission system for transmitting a sequence of frames of video data, each frame comprising a plurality of processing blocks, the system comprising:
   a communication channel;
   a video encoding apparatus comprising:
      a skip decision circuit for generating a control signal according to a similarity checking result and a comparison result between a first quantization parameter for a first processing block from a current frame and a second quantization parameter for a second processing block from a previous frame; and
      an encoder for encoding the first processing block to generate a first encoded bit stream and the first quantization parameter;
   a transmitter for transforming a first formatted bit stream into data packets and transmitting the data packets over the communication channel;
   a receiver for receiving the data packets and transforming the data packets into a second formatted bit stream;
   a video decoding apparatus comprising a reference buffer for separating the second formatted bit stream into a second encoded bit stream and a second skip flag and for reconstructing a third processing block from one of the second encoded bit stream and the reference buffer according to the second skip flag;
   wherein the second processing block resides at the same location in the previous frame as the first processing block in the current frame;
   wherein the video decoding apparatus comprises:
   a parser for separating the second formatted bit stream into the second encoded bit stream and the second skip flag;
   a storage and selection output circuit having an input terminal and an output terminal, comprising:
      the reference buffer; and
      a selection output circuit connected to the reference buffer for determining whether to transfer input data from the input terminal to the reference buffer and for transferring one of the input data and a portion of the reference buffer to the output terminal according to the second skip flag; and
      a decoder connected to one of the input and the output terminals of the storage and selection output circuit;
   wherein the selection output circuit transfers the portion of the reference buffer to the output terminal if the second skip flag indicates the third processing block is skipped, and wherein the selection output circuit transfers the input data to the reference buffer and the output terminal if the second skip flag indicates the third processing block is not skipped.

2. The system according to claim 1, wherein the video encoding apparatus further comprises:
   a similarity checking circuit coupled to the skip decision circuit for calculating a sum of absolute differences (SAD) between the first processing block and the second processing block to generate the similarity checking result.

3. The system according to claim 1, wherein the video encoding apparatus further comprises:
   a first storage device for storing syndromes of the processing blocks of each frame;
   a syndrome generator for receiving the first processing block, calculating a current syndrome for the first processing block and storing the current syndrome in the first storage device; and
   a similarity checking circuit coupled to the skip decision circuit, syndrome generator and the first storage device for comparing the current syndrome for the first processing block and a previous syndrome for the second processing block from the first storage device to generate the similarity checking result;
   wherein the current syndrome and the previous syndrome are selected from the group comprising cyclic redundancy checks (CRCs), hashes, checksums, and a combination thereof.

4. The system according to claim 1, wherein if the similarity checking result indicates the first and the second processing blocks are similar and the first quantization parameter is greater than or equal to the second quantization parameter, the control signal indicates the first processing block is skipped, otherwise the control signal indicates the first processing block is not skipped.

5. The system according to claim 1, wherein the video encoding apparatus further comprises:
   a bitstream formatting circuit coupled to the encoder for setting a first skip flag and determining whether to assemble the first encoded bit stream along with the first skip flag into a first formatted bit stream according to the control signal,
   wherein if the control signal indicates the first processing block is skipped, the bitstream formatting circuit assembles the first skip flag without the first encoded bit stream into the first formatted bit stream; and
   wherein if the control signal indicates the first processing block is not skipped, the bitstream formatting circuit assembles the first skip flag and the first encoded bit stream into the first formatted bit stream.

6. The system according to claim 5, wherein the encoder is controlled by the control signal.

7. The system according to claim 6, wherein the skip decision circuit delivers the control signal to the encoder only and the encoder delivers the control signal to the bitstream formatting circuit.

8. The system according to claim 6, wherein the skip decision circuit delivers the control signal to both the bitstream formatting circuit and the encoder.

9. The system according to claim 5, wherein the skip decision circuit delivers the control signal to the bitstream formatting circuit only.

10. The system according to claim 1, wherein the video encoding apparatus further comprises:

a second storage device coupled to the encoder and the skip decision circuit for storing a plurality of quantization parameters for the processing blocks of each frame.

11. An image transmission system for transmitting a sequence of frames of video data, each frame comprising a plurality of processing blocks, the system comprising:
   a communication channel;
   a video encoding apparatus comprising;
      a skip decision circuit for generating a control signal according to a block type, a similarity checking result and a comparison result between a first quantization parameter for a first processing block from a current frame and a second quantization parameter for a second processing block from a previous frame; and
      an encoder for encoding a third processing block to generate a first encoded bit stream and the first quantization parameter, wherein the third processing block is one of the first processing block and a residual;
   a transmitter for transforming a first formatted bit stream into data packets and transmitting the data packets over the communication channel;
   a receiver for receiving the data packets and transforming the data packets into a second formatted bit stream;
   a video decoding apparatus comprising a reference buffer and a difference buffer for separating the second formatted bit stream into a second encoded bit stream, a second skip flag and a second type flag and for reconstructing a fifth processing block from at least one of the second encoded bit stream, the reference buffer and the difference buffer according to the second skip flag and the second type flag;
   wherein the second processing block resides at the same location in the previous frame as the first processing block in the current frame;
wherein the video decoding apparatus comprises:
   a parser for separating the second formatted bit stream into the second encoded bit stream, the second skip flag and the second type flag;
   a storage and selection output circuit having an input terminal, a first output terminal and a second output terminal, comprising:
   the difference buffer;
   the reference buffer; and
   a selection output circuit connected to the difference buffer and the reference buffer for determining whether to transfer input data from the input terminal to one of the difference buffer and the reference buffer, whether to transfer one of the input data and a portion of the difference buffer to the first output terminal, and whether to output a portion of the reference buffer to the second output terminal according to the second skip flag and the second type flag;
   a decoding device connected to either the input terminal or the first and the second output terminals; and
   an adder whose first and second input terminals are connected to either the first and the second output terminals of the storage and selection output circuit or an output terminal of the decoding device;
   wherein the decoding device comprises a first decoder and a second decoder, wherein the first decoder is connected between the first output terminal of the storage and selection output circuit and the first input terminal of the adder, and the second decoder is connected between the second output terminal of the storage and selection output circuit and the second input terminal of the adder.

12. The system according to claim 11, wherein the video encoding apparatus further comprises:
   a bitstream formatting circuit coupled to the encoder for setting a first skip flag and a first type flag and determining whether to assemble the first encoded bit stream along with the first skip flag and the first type flag into the first formatted bit stream according to the block type and the control signal.

13. The system according to claim 12, wherein the residual is a difference block between the first processing block and a fourth processing block from a reference frame, further comprising:
   a type selection circuit for evaluating the first processing block and the fourth processing block to determine the block type and output the third processing block; and
   a similarity checking circuit coupled to the skip decision circuit for calculating a sum of absolute differences (SAD) between the first processing block and the second processing block to generate the similarity checking result;
   wherein the fourth processing block resides at the same location in the reference frame as the first processing block in the current frame.

14. The system according to claim 12, wherein the residual is a difference block between the first processing block and a fourth processing block from a reference frame, further comprising:
   a type selection circuit for evaluating the first processing block and the fourth processing block to determine the block type and output the third processing block;
   a first storage device for storing syndromes of the processing blocks of each frame;
   a syndrome generator for receiving the first processing block, calculating a current syndrome for the first processing block and storing the current syndrome in the first storage device; and
   a similarity checking circuit coupled to the skip decision circuit, syndrome generator and the first storage device for comparing the current syndrome for the first processing block and a previous syndrome for the second processing block from the first storage device to generate the similarity checking result;
   wherein the current syndrome and the previous syndrome are selected from the group comprising cyclic redundancy checks (CRCs), hashes, checksums, and a combination thereof; and
   wherein the fourth processing block resides at the same location in the reference frame as the first processing block in the current frame.

15. The system according to claim 12, wherein the bitstream formatting circuit further determines whether to assemble the first encoded bit stream and a motion vector along with the first skip flag and the first type flag into the first formatted bit stream according to the block type and the control signal.

16. The system according to claim 15, wherein the video encoding apparatus further comprises:
   a motion estimation circuit for estimating motion of the first processing block with respect to a reference frame to generate the motion vector and the first residual;
   a type selection circuit for evaluating the first processing block and the first residual to determine the block type and output the third processing block; and a similarity checking circuit coupled to the skip decision circuit for calculating a sum of absolute differences (SAD) between the first processing block and the second processing block to generate the similarity checking result.

17. The system according to claim 15, wherein the video encoding apparatus further comprises:
a motion estimation circuit for estimating motion of the first processing block with respect to a reference frame to generate a motion vector and the residual;
a type selection circuit for evaluating the first processing block and the residual to determine the block type and output the third processing block;
a first storage device for storing syndromes of the processing blocks of each frame;
a syndrome generator for receiving the first processing block, calculating a current syndrome for the first processing block and storing the current syndrome in the first storage device; and
a similarity checking circuit coupled to the skip decision circuit, syndrome generator and the first storage device for comparing the current syndrome for the first processing block and a previous syndrome for the second processing block from the first storage device to generate the similarity checking result;
wherein the current syndrome and the previous syndrome are selected from the group comprising cyclic redundancy checks (CRCs), hashes, checksums, and a combination thereof.

18. The system according to claim 11, wherein if the block type is forward predictive-coded, the similarity checking result indicates the first and the second processing blocks are similar and the first quantization parameter is greater than or equal to the second quantization parameter, the control signal indicates the first processing block is skipped, otherwise the control signal indicates the first processing block is not skipped.

19. The system according to claim 12, wherein the encoder is controlled by the control signal.

20. The system according to claim 19, wherein the skip decision circuit delivers the control signal to the encoder only and the encoder delivers the control signal to the bitstream formatting circuit.

21. The system according to claim 19, wherein the skip decision circuit delivers the control signal to both the bitstream formatting circuit and the encoder.

22. The system according to claim 12, wherein the skip decision circuit delivers the control signal to the bitstream formatting circuit only.

23. The system according to claim 11, further comprising:
a second storage device coupled to the encoder and the skip decision circuit for storing a plurality of quantization parameters for the processing blocks of each frame.

24. The system according to claim 11, wherein the selection output circuit transfers the portion of the difference buffer to the first decoder and a portion of the reference buffer to the second decoder if the second skip flag indicates the fifth processing block is skipped and the second type flag is forward predictive-coded, wherein the selection output circuit transfers the portion of the reference buffer to the second decoder if the second skip flag indicates the fifth processing block is skipped and the second type flag is intra-coded, wherein the selection output circuit transfers the input data to the first decoder and the reference buffer if the second skip flag indicates the fifth processing block is not skipped and the second type flag is intra-coded, and wherein the selection output circuit transfers the input data to the first decoder and the difference buffer and transfers the portion of the reference buffer to the second decoder if the second skip flag indicates the fifth processing block is not skipped and the second type flag is forward predictive-coded.

25. An image transmission system for transmitting a sequence of frames of video data, each frame comprising a plurality of processing blocks, the system comprising:
a communication channel;
a video encoding apparatus comprising;
a skip decision, circuit for generating a control signal according to a block type, a similarity checking result and a comparison result between a first quantization parameter for a first processing block from a current frame and a second quantization parameter for a second processing block from a previous frame; and
an encoder for encoding a third processing block to generate a first encoded bit stream and the first quantization parameter, wherein the third processing block is one of the first processing block and a residual;
a transmitter for transforming a first formatted bit stream into data packets and transmitting the data packets over the communication channel;
a receiver for receiving the data packets and transforming the data packets into a second formatted bit stream;
a video decoding apparatus comprising a reference buffer and a difference buffer for separating the second formatted bit stream into a second encoded bit stream, a skip flag and a type flag and for reconstructing a fifth processing block from at least one of the second encoded bit stream, the reference buffer and the difference buffer according to the skip flag and the type flag;
wherein the second processing block resides at the same location in the previous frame as the first processing block in the current frame;
wherein the video decoding apparatus comprises:
a parser for separating the second formatted bit stream into the second encoded bit stream, the skip flag and the type flag;
a storage and selection output circuit having an input terminal, a first output terminal and a second output terminal, comprising:
the difference buffer;
the reference buffer; and
a selection output circuit connected to the difference buffer and the reference buffer for determining whether to transfer input data from the input terminal to one of the difference buffer and the reference buffer, whether to transfer one of the input data and a portion of the difference buffer to the first output terminal, and whether to output a portion of the reference buffer to the second output terminal according to the skip flag and the type flag;
a decoding device connected to either the input terminal or the first and the second output terminals; and
an adder whose first and second input terminals are connected to either the first and the second output terminals of the storage and selection output circuit or an output terminal of the decoding device;
wherein the decoding device is connected between the parser and the input terminal of the storage and selection output circuit, and the two input terminals of the adder are respectively connected to the two output terminals of the storage and selection output circuit;

wherein the selection output circuit transfers the portion of the difference buffer to the first input terminal of the adder and a portion of the reference buffer to the second input terminal of the adder if the skip flag indicates the fifth processing block is skipped and the type flag is forward predictive-coded, wherein the selection output circuit transfers the portion of the reference buffer to the second input terminal of the adder if the skip flag indicates the fifth processing block is skipped and the type flag is intra-coded, wherein the selection output circuit transfers the input data to the first input terminal of the adder and the reference buffer if the skip flag indicates the fifth processing block is not skipped and the type flag is intra-coded, and wherein the selection output circuit transfers the input data to both the first input terminal of the adder and the difference buffer and transfers the portion of the reference buffer to the second input terminal of the adder if the skip flag indicates the fifth processing block is not skipped and the type flag is forward predictive-coded.

* * * * *